(12) United States Patent
Shimotani et al.

(10) Patent No.: US 7,907,323 B2
(45) Date of Patent: Mar. 15, 2011

(54) DISPLAY METHOD, DISPLAY MEDIUM, AND DISPLAY DEVICE

(75) Inventors: Kei Shimotani, Kanagawa (JP); Jun Kawahara, Kanagawa (JP); Satoshi Tatsuura, Kanagawa (JP); Yasuo Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 818 days.

(21) Appl. No.: 11/600,229

(22) Filed: Nov. 16, 2006

(65) Prior Publication Data

US 2007/0297040 A1 Dec. 27, 2007

(30) Foreign Application Priority Data

Jun. 9, 2006 (JP) .................................. 2006-161176

(51) Int. Cl.
*G02F 1/153* (2006.01)
(52) U.S. Cl. ......................... 359/270; 345/204
(58) Field of Classification Search .................. 345/204; 359/270
See application file for complete search history.

(56) References Cited

U.S. PATENT DOCUMENTS

| | | | | |
|---|---|---|---|---|
| 3,806,229 A * | 4/1974 | Schoot et al. | ................. | 359/273 |
| 5,864,420 A * | 1/1999 | Udaka et al. | ................. | 359/270 |
| 6,219,173 B1 * | 4/2001 | Udaka et al. | ................. | 359/272 |
| 6,580,545 B2 * | 6/2003 | Morrison et al. | ............. | 359/265 |
| 7,135,054 B2 * | 11/2006 | Jin et al. | ........................... | 75/255 |
| 2001/0046081 A1 * | 11/2001 | Hayashi et al. | ................ | 359/296 |
| 2004/0239613 A1 * | 12/2004 | Kishi | ............................. | 345/107 |
| 2004/0257330 A1 * | 12/2004 | Minami | ........................ | 345/107 |
| 2006/0139724 A1 * | 6/2006 | Liang et al. | .................... | 359/265 |
| 2006/0152536 A1 * | 7/2006 | Ueda | ............................. | 345/901 |
| 2006/0285195 A1 * | 12/2006 | Moriyama et al. | ............. | 359/296 |

FOREIGN PATENT DOCUMENTS

| | | |
|---|---|---|
| JP | A 11-101994 | 4/1999 |
| JP | A 2000-338528 | 12/2000 |
| JP | A 2004-018549 | 1/2004 |
| JP | A 2004-198451 | 7/2004 |
| JP | A 2005-092183 | 4/2005 |

OTHER PUBLICATIONS

Sandmann, G., et al. "Preparation of silver nanoparticles on ITO surfaces by a double-pulse method," Journal of Elctroanalytical Chemistry, vol. 491, 78-86 pp. (2000).

* cited by examiner

*Primary Examiner* — Amr Awad
*Assistant Examiner* — Jarurat Suteerawongsa
(74) *Attorney, Agent, or Firm* — Oliff & Berridge, PLC

(57) ABSTRACT

A predetermined image is displayed forming an electric field in an electrolytic layer comprising an electrolytic solution containing at least a metal ion, thereby, depositing the metal ion in the electrolytic solution layer as a polygonal metal particle.

28 Claims, 18 Drawing Sheets

DISPLAY METHOD, DISPLAY MEDIUM, AND DISPLAY DEVICE

BACKGROUND

1. Technical Field

The present invention relates to a display method, and a display medium and a display device using this display method.

2. Related Art

With progression of informatiztion in recent years, a consumption amount of a paper as an information transmitting medium is being increased. On the other hand, as a medium which is a substitute for a paper, an image display medium called electronic paper, which can perform recording and erasing of an image repeatedly, is being paid an attention. In order to put an electronic paper into practice, it is required that, like a paper, an electronic paper is suitable for carriage, is light, is not bulky (thin), uses a small amount of energy necessary for re-writing, and undergoes little deterioration when re-writing is performed repeatedly, and is excellent in reliance.

As the displaying technique suitable for utilization of such the display medium, there is a method of displaying by depositing and dissolving a metal such as silver by electric field application utilizing an electrolytic solution such as a silver salt solution.

It is said that such the electrolysis deposition-type electronic paper is excellent as compared with other kind of rewritable marking technique and, as a metal, a nanoparticle of silver is used in many cases in such the electrolysis deposition-type electronic paper. However, a current electrolysis deposition-type electronic paper deposits silver, displaying white and black.

As the technique of changing a color due to surface plasmon resonance by controlling a particle diameter of a metal nanoparticle, there is the technique of controlling a particle diameter of deposited silver at a nano-order by adjusting an application voltage.

However, by the aforementioned previous technique, characteristic surface plasmon resonance can be produced by controlling a particle diameter of metal nanoparticles, but a wavelength region of produced surface plasmon resonance is limited to a constant wavelength region determined by a metal species and a particle diameter within a whole visible light region, and it is difficult to realize color development over a wide range in a visible light region.

SUMMARY

According to an aspect of the present invention, there is provided a display method, comprising: forming an electric field in an electrolytic solution layer comprising an electrolytic solution containing at least a metal ion; thereby, reducing the metal ion in the electrolytic solution layer to deposit it as a polygonal metal particle, and displaying a predetermined image.

BRIEF DESCRIPTION OF THE DRAWINGS

Exemplary embodiments of the present invention will be described in detail based on the following figures, wherein:

FIG. 1A shows the state where a polygonal metal particle is not deposited, and FIG. 1B shows the state where a polygonal metal particle is deposited;

DETAILED DESCRIPTION

Construction of the display device and the display medium will be explained below using FIG. 1.

Figure 1A:
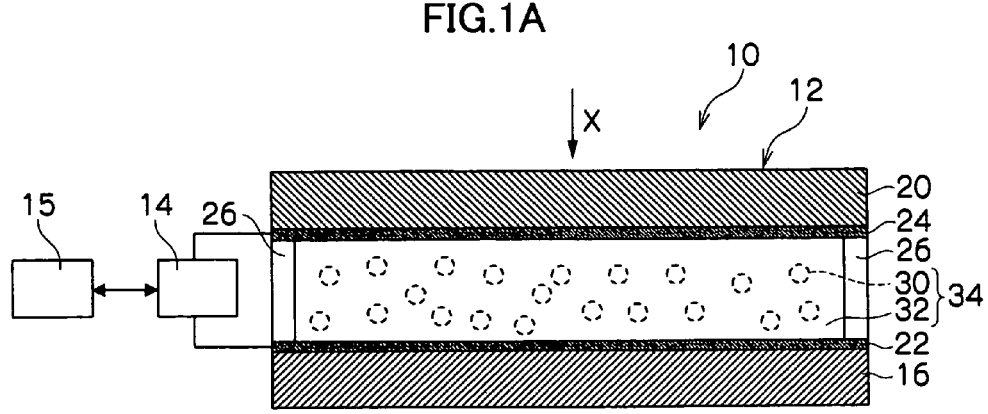
FIG. 1A and FIG. 1B are a schematic cross-sectional view showing one example of the display medium and the display device of the aspect of the invention.

As shown in FIG. 1A, the display device 10 of the invention comprises a display medium 12 comprising an electrolytic solution layer 34, a voltage applying part 14 for applying a voltage to an electrolyte solution layer 34, and a controlling part 15 for controlling a voltage applying part 14 in order to adjust a voltage value to be applied to an electrolyte solution layer 34.

In this respect, the display device 10 corresponds to the display device of the invention, the display medium 12 corresponds to the display medium of the invention, and the electrolyte solution layer 34 corresponds to the electrolyte solution layer of the display device and the display medium of the invention.

The display medium 12 comprises a rear substrate 16, a displaying substrate 20 which is oppositely arranged with a gap to the rear substrate 16, a plurality of gap members 26, an electrolyte solution layer 34, a second electrode 22, and a first electrode 24.

When a rear substrate 16 and a displaying substrate 20 are constructed of a material having electrical conductivity, since each of a rear substrate 16 and a displaying substrate 20 functions as a second electrode 22 and a first electrode 24, a construction is also possible in which a second electrode 22 and a first electrode 24 are not provided.

The display medium 12 is constructed such that a second electrode 22, an electrolytic solution layer 34, a first electrode 24, and a displaying substrate 20 are laminated on a rear substrate 16 in this order.

A gap member 26 is a member for retaining a gap between a rear substrate 16 and a displaying substrate 20 at a predetermined gap and, at the same time, for suppressing an electrolytic solution of an electrolytic solution layer 34 from flowing out to the outside of a display medium 12, and a plurality of members are provided between a rear substrate 16 and a displaying substrate 20.

An electrolytic solution layer 34 is a general term of respective regions (hereinafter, conveniently, referred to as cell) formed by being surrounded by a second electrode 22 laminated on a rear substrate 16, a gap member 26, and a first electrode 24 laminated on a displaying substrate 20, and is a layer which comprises an electrode solution 32, and exerts the function of displaying color.

That is, by a region between a rear substrate 16 and a displaying substrate 20 being compartmentalized into a plurality of parts by a gap member 26, an electrolytic solution layer 34 (described in detail later) is divided into a plurality of regions.

A voltage applying part 14 for forming an electric field in an electrolytic solution layer 34 by applying a voltage to a second electrode 22 and a first electrode 24 is connected to a second electrode 22 and a first electrode 24 so that they can receive a signal. The second electrode 22, the first electrode 24, the voltage applying part 14, and the controlling part 15 correspond to a voltage applying unit of the display device 10 of the invention.

Of a displaying substrate 20 and a rear substrate 16, at least a displaying substrate 20 is constructed of a transparent substrate.

A displaying substrate 20 and a rear substrate 16 are not particularly limited as far as, since a polygonal metal particle is deposited on a surface thereof, they are not deteriorated and eroded by imparting an electrolytic solution or irritation, and can stably retain a polygonal metal particle at the same position during a polygonal metal particle deposited from an electrolytic solution is dissolved again.

As the transparent substrate, a film and a plate-like substrate of a polymer such as polyester (e.g. polyethylene terephthalate), polyimide, polymethyl methacrylate, polystyrene, polypropylene, polyethylene, polyamide, nylon, polyvinyl chloride, polyvinylidene chloride, polycarbonate, polyether sulfone, a silicone resin, a polyacetal resin, a fluorine resin, a cellulose derivative, and polyolefin, a glass substrate, a metal substrate, and an inorganic substrate such as a ceramic substrate are preferably used. It is preferable that the transparent substrate has a light transmittance (visible light) of at least 50% or higher.

A material for a gap member 26 is not particularly limited, but the known resin material can be used and, from a viewpoint of manufacturing, it is preferable to use a photosensitive resin.

A width (a length in a direction orthogonal with a laminating direction of a display medium 12) of a gap member 26 is not particularly limited, but generally, a smaller width is effective from a viewpoint of resolution of a display device 10 and, usually, around 1 μm to 1 mm is preferable.

A height of a gap member, that is, a thickness of an electrolytic solution layer 34 is appropriately determined by a size, a weight, and color showing property of a display medium 12 to be manufactured, and is 1 μm to 200 μm, preferably 3 μm to 100 μm.

This gap member 26 may be granular. A particle size distribution is preferably narrow, more preferably monodisperse. A color is pale, more preferably white. A material is preferably the aforementioned polymer fine particle, or silicon dioxide or titanium oxide. It is preferable that a surface of these particles is treated with a surface treating agent such as a silane coupling agent, and a titanium coupling agent for the purpose of dispersity in a solvent and protection from a solvent.

The aforementioned member and each layer are adhered via an adhesive layer not shown. A material for an adhesive layer is not particularly limited, but a thermosetting resin, or a ultraviolet-ray curing resin may be used, and a material which does not influence on a material of each member constituting a display medium 12 such as a gap member 26 and an electrolytic solution 32 contained in an electrolytic solution layer 34 is selected.

Of a second electrode 22 and a first electrode 24, as at least a first electrode 24 which is provided on a sighting direction X side of a display medium 12, a transparent electrode having a light transmittance (visible light) of at least 50% or higher is used.

Specifically, a metal oxide layer, a representative of which is tin oxide-indium oxide (ITO), tin oxide and zinc oxide, is preferably used. An electrode may be formed by using these materials alone, or by laminating a plurality of materials.

A thickness and a size of a second electrode 22 and a first electrode 24 are not particularly limited, but various ones can be utilized depending on a display medium 12.

In order to realize high resolution of a display device 10, a display medium 12 may be configured such that a plurality of cells are arranged in a direction along a plate surface of a rear substrate 16 by compartmentalizing between a rear substrate 16 and a displaying substrate 20 with a gap member 26 into a plurality of cells so that an electrolytic solution layer 34 is compartmentalized into a plurality of cells in a direction along a substrate surface of a rear substrate 16.

When one or a plurality of compartments of this cell are provided, for example, corresponding to each pixel of an image when an image is displayed on a surface medium 12, it becomes possible to adjust a displayed color every region corresponding to each pixel, and this is preferable, but this may not correspond to an pixel or a particular region.

An electrolytic solution layer 34 is a general term of respective regions (hereinafter, conveniently, referred to as cell) formed by being surrounded by a second electrode 22 laminated on a rear substrate 16, a gap member 26, and a first electrode 24 laminated on a displaying substrate 20, and is a layer which comprises an electrolytic solution 32, and exerts the function of displaying a color.

In addition, by compartmentalizing an electrolytic solution layer 34 of a display medium 12 with a gap member 26 into a plurality of regions like this, even when a part of a display medium 12 is damaged, it becomes possible to suppress damage of the function of a whole display medium 12.

It is preferable that a display medium 12 has flexibility. In this case, it becomes easy to utilize a display medium 12 in utility requiring flexibility such as an electronic paper and a portable electronic equipment. When used in such the utility, it is preferable to use a material having flexibility as a displaying substrate 20, a rear substrate 16, a gap member 26, a first electrode 24, and a second electrode 22.

Then, an electrolytic solution layer 34 will be explained.

An electrolytic solution layer 34 comprises an electrolytic solution 32 and, in an electrolytic solution 32, at least a metal ion 30 is dissolved and, at the same time, a surfactant is contained. An electrolytic solution layer 34 comprises an electrolytic solution 32 containing at least this metal ion 30 and a surfactant and, when used as a display device 10 and a display medium 12, the layer exerts the function of displaying various colors.

Figure 1B:
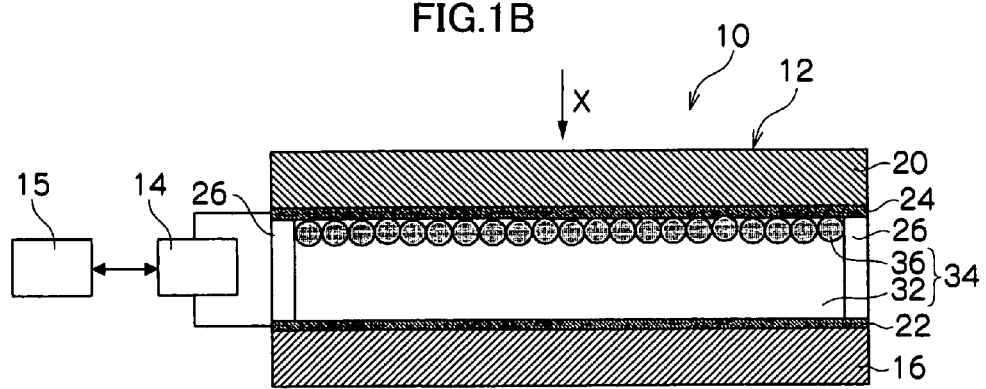

As shown in FIG. 1A, a metal ion 30 is reduced by applying a voltage of a deposition potential to an electrolytic solution layer 34 and, as shown in FIG. 1B, the ion is deposited as a polygonal metal particle 36 described in detail later. A deposited polygonal metal particle 36 is oxidized into a metal ion 30 by applying a voltage of a dissolution potential, and is dissolved in an electrolytic solution 32 (see FIG. 1A).

This deposition potential is a potential at which a metal ion 30 dissolved in an electrolytic solution 32 can be reduced to deposit, and a dissolution potential is a potential at which at least a part of a deposited metal can be reduced to dissolve it as a metal ion 30.

Figure 2:
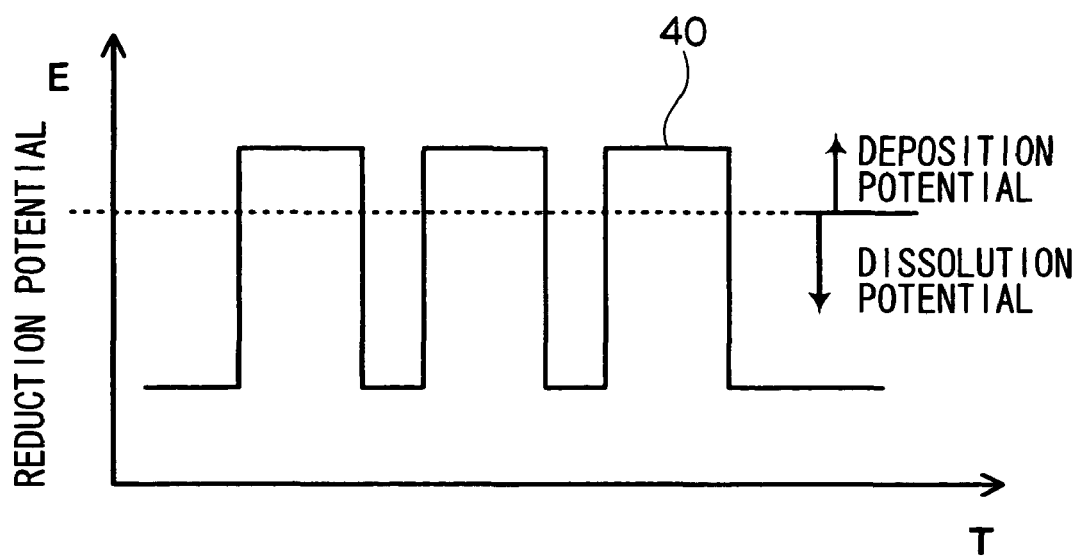
FIG. 2 is a schematic view showing one example of a first voltage waveform.

Specifically, as shown in FIG. 2, when a voltage above a reduction potential as a threshold between a deposition potential and a dissolution potential, that is, a threshold at which a metal ion 30 is reduced is applied, a metal particle is deposited by a reducing reaction of a metal ion 30 in an electrolytic solution 32. In addition, when a voltage below this reduction potential is applied, a deposited metal particle is oxidized by an oxidizing reaction to become a metal ion 30, and is dissolved in an electrolytic solution 32.

Herein, the "above reduction potential" indicates such a potential that a reducing reaction of a metal ion 30 prevails over an oxidizing reaction of a metal particle. Similarly, the "below reduction potential" indicates such a potential that an oxidizing reaction of a deposited polygonal metal particle 36 prevails over a reducing reaction of a metal ion 30.

In a display medium 12, although a detailed action will be described later, a polygonal shape polygonal metal particle 36 is deposited by electrolysis formation into an electrolytic solution 32.

This "polygonal shape" is a shape having a planar part on at least a part of an external circumference, may be non-spherical, and examples include triangular pyramid, triangle pole, circular cylinder, square pole, and pentagonal pole.

A deposited polygonal metal particle shows color due to surface plasmon resonance.

This "shows color due to surface plasmon resonance" indicates that a deposited polygonal metal particle has an absorption wavelength due to surface plasmon resonance in a visible light region, and shows color (color showing property) depending on this absorption wavelength due to surface plasmon resonance. This "has absorption wavelength due to surface plasmon resonance in a visible light region" means that a light absorption peak due to surface plasmon resonance of a polygonal metal particle is possessed in a wavelength region of visible light.

Color showing due to such the surface plasmon resonance is seen in so-called nano-particles having a particle diameter of around a few nm to a few tens nm, is high in a chroma and a beam transmittance, and is excellent in durability. By performing display utilizing color showing due to this surface plasmon resonance on a display device and a display medium, a display device and a display medium excellent in a chroma, durability, and a beam transmittance can be provided.

Examples of a metal ion contained in an electrolytic solution 32, from a viewpoint that when deposited as a polygonal metal particle, a light absorption peak due to surface plasmon resonance of a polygonal metal particle is possessed in 400 nm to 800 nm which is a wavelength of light in a visible light region, include ions of a metal such as gold, silver, copper, ruthenium, rhodium, palladium, osmium, iridium, platinum, nickel, iron, cobalt, zinc, lead, chromium, and tin. Among them, from a viewpoint that a change in an absorption wavelength due to difference in a shape of a polygonal metal particle is great, silver and gold are preferably used.

A length of each side of a deposited polygonal metal particle is preferably 1 to 100 nm, particularly preferably 2 to 50 nm for the reason that surface plasmon resonance effectively occurs. When a length is 100 nm or more, surface plasmon resonance does not occur in some cases. A polygonal metal particle in a range of 1 to 100 nm is significant in that it is practical and better in intensity of a color. Particularly, when a length is in a range of 2 to 50 nm, intensity of a color can be improved more. For this reason, field angle dependency can be lowered more, and a contrast can be improved more.

As a method of measuring a length of each side of a polygonal metal particle, there are a laser diffraction scattering method of irradiating a polygonal metal particle group with laser light, and measuring an average particle diameter from diffraction emitted therefrom, and an intensity distribution pattern of scattered light, and a method of performing image analysis or direct measurement from a photograph of a particle observed with a scanning electron microscope (SEM).

As a method of measuring a length of each side of a particle in the invention, the aforementioned method of directly measuring a length from a SEM photography is adopted.

A concentration of a metal ion contained in an electrolytic solution layer 34 relative to a total mass of components constituting the electrolytic solution layer 34 is not particularly limited as far as it is a concentration at which a desired hue is obtained, but from a viewpoint of stability of an electrolytic solution 32, maintenance of a color concentration, and a response rate from an applying of irritation to display of an image, it is preferable that a concentration is in a range of 0.0001 to 5 mol/l.

A metal ion 30 contained in an electrolytic solution 32 can be obtained by using, as a raw material, a metal compound containing the aforementioned metal. A metal compound is not particularly limited as far as it contains the aforementioned metal, but examples include chloroauric acid, silver nitrate, silver acetate, silver perchlorate, silver iodide, chloroplatinic acid, potassium chloroplatinate, copper (II) chloride, copper (II) acetate, and copper (II) sulfate.

By dissolving these metal compounds in an electrolytic solution 32, a metal ion 30 of the aforementioned metal is made to be contained in an electrolytic solution layer 34.

An electrolytic solution 32 of a display medium 12 contains a surfactant.

A surfactant is essential that it is a surfactant having an alkyl chain of a carbon number of 1 or more and 20 or less in a main chain of a molecule, a carbon number of 2 or more and 18 or less is preferable, and a carbon number of 4 or more and 16 or less is particularly preferable.

Examples of such the surfactant include a cationic surfactant such as an amine salt, an ammonium salt, and a phosphate salt, an anionic surfactant such as sulfonate, and a nonionic surfactant and, inter alia, from a viewpoint of a charge of a metal ion, a cationic surfactant can be suitably used.

Examples of such the surfactant include tetramethylammonium bromide, tetraethylammonium bromide, tetrabutylammonium bromide, butyltriethylammonium bromide, tetraoctylammonium bromide, tetradodecylammonium bromide, dodecyltrimethylammonium bromide, hexadecyltrimethylammonium bromide, or alkylammonium chloride and alkylammonium iodide in which the anion is changed, or alkylphosphonium bromide in which ammonium is changed to phosphoric acid, being not limiting.

It is enough that a surfactant contained in an electrolytic solution 32 of a display medium 12 contains at least one kind of the aforementioned surfactants, but a plurality of surfactants may be contained.

An amount of a surfactant contained in an electrolytic solution 32 in the invention is preferably 1 part by weight or more and 10,000 parts by weight or less, more preferably 10 parts by weight or more and 5,000 parts by weight or less, further preferably 100 parts by weight or more and 3,000 parts by weight or less based on 100 parts by weight of a metal ion.

When an amount of a surfactant contained in an electrolytic solution 32 is less than 1 part by weight based on 100 parts by weight of a metal ion, there is a problem that a deposited particle may not be completely covered with a surfactant, and shape control may become difficult and, when the amount exceeds 10,000 parts by weight, there is a problem that the surfactant may become difficult to be dissolved.

For example, by forming an electric field in an electrolytic solution 32 in the state where a surfactant is contained in an electrolytic solution 32 containing the metal ion 30, a shape of a deposited particle can be made to be a polygonal shape. In addition, by a surfactant being contained in an electrolytic solution 32, a deposited polygonal metal particle 36 can be stabilized.

Specifically, as a length of an alkyl chain of a surfactant becomes greater, a more polygonal metal particle, for example, a polygonal metal particle having a shape of a triangle pole, a square pole, or a pentagon pole can be deposited. In addition, as an amount of a surfactant to be added to an electrolytic solution 32 becomes greater, it becomes possible to make a size of a deposited polygonal metal particle smaller.

An electrolytic solution 32 constituting an electrolytic solution layer 34 is not particularly limited as far as it is constructed as containing at least the metal ion 30, the surfactant, and a solvent for dissolving a metal ion 30 and, if necessary, various materials can be used.

As a solvent, an alcohol such as methanol, ethanol, and isopropyl alcohol, and other non-aqueous solvent (organic solvent etc.) can be utilized alone or by combining two or more kinds.

Examples of the non-aqueous solvent include aprotic non-aqueous solvents such as ethylene carbonate, propylene carbonate, butylene carbonate, dimethyl carbonate, diethyl carbonate, ethyl methyl carbonate, methyl acetate, ethyl acetate, ethyl propionate, dimethyl sulfoxide, γ-butyrolactone, dimethoxyethane, diethoxyethane, tetrahydrofuran, formamide, dimethylformamide, diethylformamide, dimethylacetamide, acetonitrile, propionitrile, methylpyrrolidone, and silicone oil.

An electrolytic solution 32 may conveniently contain, as an additive, a water-soluble resin, a surfactant, an electrolyte substance other than a metal ion which is deposited as a polygonal metal particle, a polymer fine particle, and a metal oxide fine particle. That is, as the solvent, a solvent which dissolves the metal, and can contain an electrolyte substance, a polymer and a surfactant is selected.

As the water-soluble resin, polymers such as polyalkylene oxide such as polyethylene oxide, polyalkyleneimine such as polyethyleneimine, polyethylene sulfide, polyacrylate, polymethyl methacrylate, polyvinylidene fluoride, polycarbonate, polyacrylonitrile, and polyvinyl alcohol can be used alone, or by combining plural of them.

By dissolving or dispersing a water-soluble resin in an electrolytic solution 32, control of a moving rate of a metal ion 30 in an electrolytic solution layer 34, and stabilization of a deposited polygonal metal particle 36 can be performed. An amount of a water-soluble resin to be added to an electrolytic solution 32 may be appropriately adjusted depending on a kind of a metal ion 30, and other addition amount.

It is preferable that an electrolytic solution 32 contains a counter ion of a metal ion.

This counter ion is not particularly limited as far as, unless the deposition voltage is applied to an electrolytic solution layer 34, a metal ion 30 can stably reside in the ionic state in an electrolytic solution 32, but examples include a fluorine ion, a chlorine ion, a bromine ion, a bromine ion, an iodine ion, a perchloric ion, and borofluoride ion.

An electrolytic solution 32 may be gel-like. By gelling an electrolytic solution 32, even when a part of a display medium 12 is damaged, it becomes easy to prevent an electrolytic solution 32 from flowing or leaking to the outside of a display medium 12. For gelling an electrolytic solution 32, a water-soluble resin can be utilized.

A controlling part 15 controls a voltage application part 14 so that a predetermined voltage is applied to an electrolytic solution layer 34. When this predetermined voltage is applied to an electrolytic solution layer 34, and an electric field is formed in an electrolytic solution 32 of an electrolytic solution layer 34, a polygonal shape polygonal metal particle is deposited.

The predetermined voltage may be a voltage of the deposition potential and, as shown in FIG. 2, a voltage of a voltage waveform (hereinafter, conveniently, referred to as first voltage waveform) which is periodically changed between a deposition potential and a dissolution potential, and a relationship between a time T1 during which a deposition potential is continued and a time T2 during which a dissolution potential is continued satisfies a relationship of the following equation (1) is more preferable.

$$100(\%) > \frac{T1}{T1+T2} \times 100 > 50(\%) \qquad \text{Equation (1)}$$

A value of T1×100/(T1+T2) in the above equation (1) is essential that it is greater than 50 and less than 100 as shown in the above equation (1), more preferably in a range of 55 or more and 95 or less, particularly preferably in a range of 60 or more and 90 or less.

When a value of T1×100/(T1+T2) in the above equation (1) is 100%, a dissolution potential is not contained in a first voltage waveform, deposition of a polygonal metal particle occurs, but there is a possibility that a size of a polygonal metal particle becomes uneven and, when the value is 50% or less, since a dissolution potential continuation voltage application time T2 becomes longer than a deposition potential continuation voltage application time T1, dissolution prevails over deposition, deposition of a polygonal metal particle due to application of a voltage which is changed by a first voltage waveform does not occur, being not preferable.

When a voltage which is changed by the first voltage waveform is applied to an electrolytic solution layer 34, during continuation of application of a voltage of a deposition potential (time T1), a reducing reaction of a metal ion 30 dissolved in an electrolytic solution 32 proceeds, and a metal ion 30 is reduced, and deposited as a polygonal metal particle. Further, during continuation of application of a voltage of a dissolution potential (time T2), an oxidizing reaction of a deposited polygonal metal particle proceeds, a smaller particle among polygonal metal particles deposited by an oxidizing reaction is dissolved in an electrolytic solution 32 as a metal ion 30, it is not present as a particle, and a larger particle is reduced in its size.

For this reason, when a voltage which is changed by a first voltage waveform is applied to an electrolytic solution layer 34, since deposition of a polygonal metal particle and dissolution of a polygonal metal particle periodically occur, and a time T1 during which application of a voltage of a deposition potential is continued is longer than a time T2 during which application of a voltage of a dissolution potential is continued, deposition of a polygonal metal particle in which unevenness in a size of a particle is suppressed can be realized.

In an example shown in FIG. 2, the case where a first voltage waveform 40 is a rectangular wave is explained, but a waveform of any shape such as a waveform having a flat part on a high potential part and a low potential part, a rectangle, a sine wave in which a potential continuously changes and a triangular wave may be used.

From a diffusion rate of a metal ion, and a reaction rate of oxidation and reduction, a frequency of this first voltage waveform is preferably 10 Hz to 100 MHz, further preferably 50 Hz to 10 MHz, particularly preferably 100 Hz to 1 MHz.

A reduction potential, a shape (sine wave, rectangular wave etc.) of a first voltage waveform 40, and a frequency for defining this first voltage waveform 40 are determined by a kind of an electrolytic solution 32, a kind of a second electrode 22 and a first electrode 24, and a thickness (i.e. distance between second electrode 22 and first electrode 24) of a gap member 26.

Specifically, a reduction voltage is determined by condition such as a kind and a concentration of a solvent of a metal ion 30 dissolved in an electrolytic solution 32, and a kind and a concentration of other additive.

In addition, a shape (sine wave, rectangular wave etc.) of a first voltage waveform 40, and an amplitude width from a reduction potential are determined by the condition that a substance other than a silver ion contained in an electrolytic solution is not reduced and oxidized as much as possible.

In addition, as a time for application of a voltage which is changed by this first voltage waveform, a voltage may be applied until an objective amount of a polygonal metal particle is deposited on an electrode surface.

By applying the aforementioned voltage to an electrolytic solution 32 of an electrolytic solution layer 34, a metal ion 30 in an electrolytic solution 32 can be reduced to deposit a polygonal shape polygonal metal particle.

Although action that a polygonal shape polygonal metal particle is deposited like this is not clear, it is thought that a surfactant surrounds a metal particle or a metal ion during a deposition process, and transference of an electron from an electrode is limited by a length of an alkyl chain.

A length of a long side of a deposited polygonal metal particle is preferably 1 to 1,000 nm, particularly preferably 2 to 500 nm. A polygonal metal particle having a length of a long side in a range of 4 to 100 nm is practical, and is significant in that intensity of a color is better.

A length of a side of a polygonal metal particle in the invention is calculated by image analysis from an image of a deposited polygonal metal particle observed with an electron microscope.

Herein, as described above, a light absorption peak due to surface plasmon resonance appears at a wavelength depending on a length of each side of a particle. For this reason, a deposited particle exhibits a color showing property depending on a length of each side of a particle.

Figure 3A:
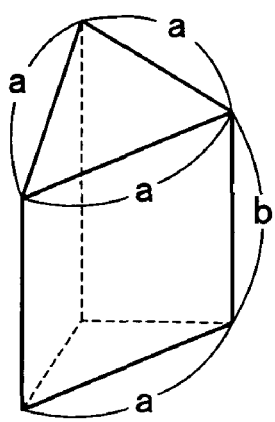
FIG. 3A is a schematic view showing the case where a shape of a deposited polygonal metal particle has a triangle pole shape.
Figure 3B:
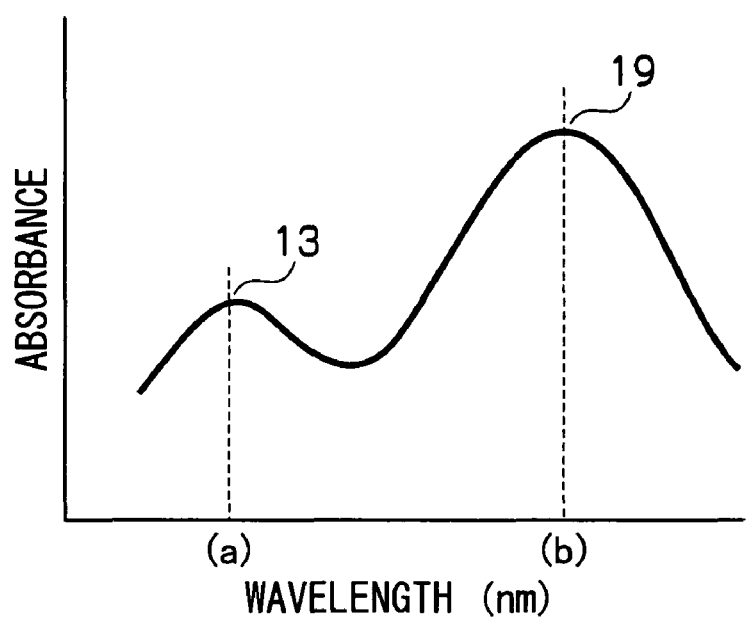
FIG. 3B is a schematic view showing a light absorption peak of a particle having a shape of FIG. 3A.

For example, given that a shape of a deposited particle has a triangle pole shape, and sides of the triangle pole are constructed of two kinds of sides of a length a and a length b as shown in FIG. 3A, such the particle having sides of different length has two light absorption peaks of a light absorption peak 13 corresponding to a side length a and a light absorption peak 19 corresponding to a side length b as shown in FIG. 3B.

For this reason, when a shape of a deposited particle is a shape constructed of two or more kinds of sides having different lengths like a triangle pole, a particle having such the shape has a plurality of light absorption peaks having different wavelengths depending on a kind of a side length.

Figure 4A:
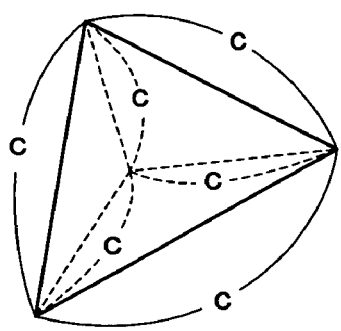
FIG. 4A is a schematic view showing a polygonal metal particle which has a triangular pyramid shape.
Figure 4B:
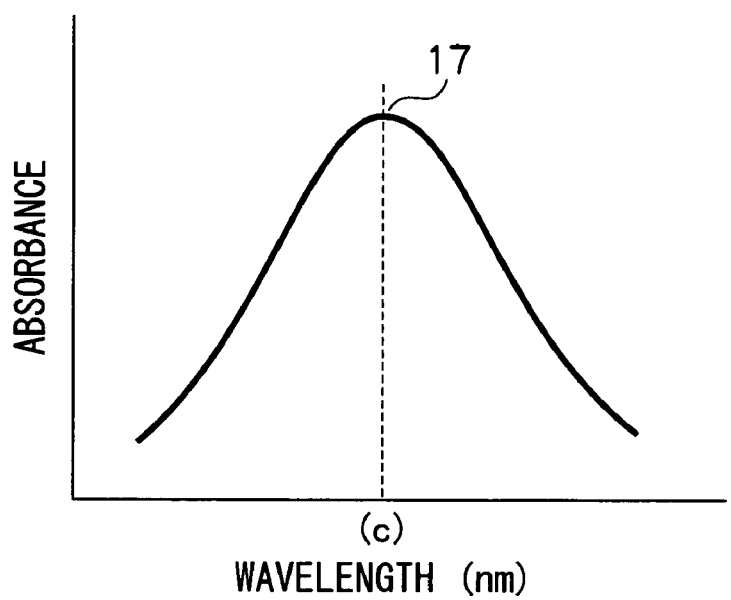
FIG. 4B is a schematic view showing a light absorption peak of a polygonal metal particle.

On the other hand, when a shape of a deposited particle has a triangular pyramid shape, and lengths of sides of a triangular pyramid are uniform (e.g. length c) as shown in FIG. 4A, a polygonal metal particle has only a light absorption peak 17 corresponding to a side length c as shown in FIG. 4B.

Since color showing due to surface plasmon resonance depends on a length of each side of a deposited particle, it can be said that as lengths of sides of a polygonal metal particle are more uniform, the particle has a color showing property high in a color purity as compared with a particle having un-uniform lengths of sides.

Since a deposited polygonal metal particle has a different color showing property depending on a length of each side of a polygonal metal particle like this, a display device 10 can display a color depending on a shape of a deposited polygonal metal particle.

Then, one example of a display method in a display device 10 shown in FIG. 1 will be explained.

The present example will be explained given that a rectangular wave shown in FIG. 2 as a first voltage waveform is applied to a display device 10. This first voltage waveform satisfies a relationship of the equation (1) as described above.

In the state where a metal ion 30 is dissolved in an electrolytic solution 32, when visually confirmed from a sighting direction (an arrow X direction in FIG. 1), in a display medium 12, a color resulting from a second electrode 22 or a rear substrate 16 is visually confirmed via a displaying substrate 20, a transparent first electrode 24, and an electrolytic solution layer 34.

When a voltage application part 14 is controlled by control of a controlling part 15 so as to apply a voltage changing with a first voltage waveform to a first electrode 24 and a second electrode 22, a voltage application part 14 applies a voltage changing with a first voltage waveform to a first electrode 24 and a second electrode 22.

Thereupon, since a metal ion 30 is a cation, a first electrode 24 side provided on a sighting direction X upstream side is a minus electrode, and a second electrode 22 side provided on a sighting direction X downstream side is a plus electrode and, in this state, a voltage is applied, so that a polygonal metal particle is deposited on a sighting direction X upstream side of a display medium 12.

When a voltage changing with a first voltage waveform is applied to an electrolytic solution layer 34 via this first electrode 24 and second electrode 22, a polygonal metal particle 36 is deposited on a displaying substrate 20 side by alternate application of a deposition potential and a dissolution potential.

And, when visually confirmed from a sighting direction X side, a color shown by surface plasmon resonance depending on a shape and a size (length of each side) of a polygonal metal particle deposited on a displaying substrate 20 side is visually confirmed as a color of a display device 10.

Further, when a voltage application part 14 is controlled by controlling of a controlling part 15 so as to apply a voltage of a dissolution potential to a first electrode 24 and a second electrode 22 for a predetermined time or longer, a voltage applying part 14 applies a voltage of a dissolution potential to a first electrode 24 and a second electrode 22 for a predetermined time or longer.

This "predetermined time" may be a time during which approximately all of deposited polygonal metal particles 36 are oxidized, and are dissolved in an electrolytic solution 32 as a metal ion 30, and may be determined by measurement every display medium 12 in advance.

When a voltage of a dissolution potential is applied for the predetermined time or longer, since as shown in FIG. 1B, a deposited polygonal metal particle 36 is oxidized and, as shown in FIG. 1A, converted into a metal ion 30 to be dissolved in an electrolytic solution 32, a display device 10, when visually confirmed from a sighting direction X side, is visually confirmed as a color resulting from a second electrode 22 or a rear substrate 16.

As explained above, a display medium 12 of a display device 10 exhibits a color depending on a shape of a deposited polygonal metal particle 36. Since a color exhibited by a deposited polygonal metal particle 36 is determined by a shape, a display device 10 and a display medium 12 can exhibit a color over a wide range of a visible light region by adjusting a kind of a metal ion 30 to be dissolved in an electrolytic solution layer 34, and a kind and a concentration of a surfactant to form an electric field in an electrolytic solution layer 34.

Figure 5:
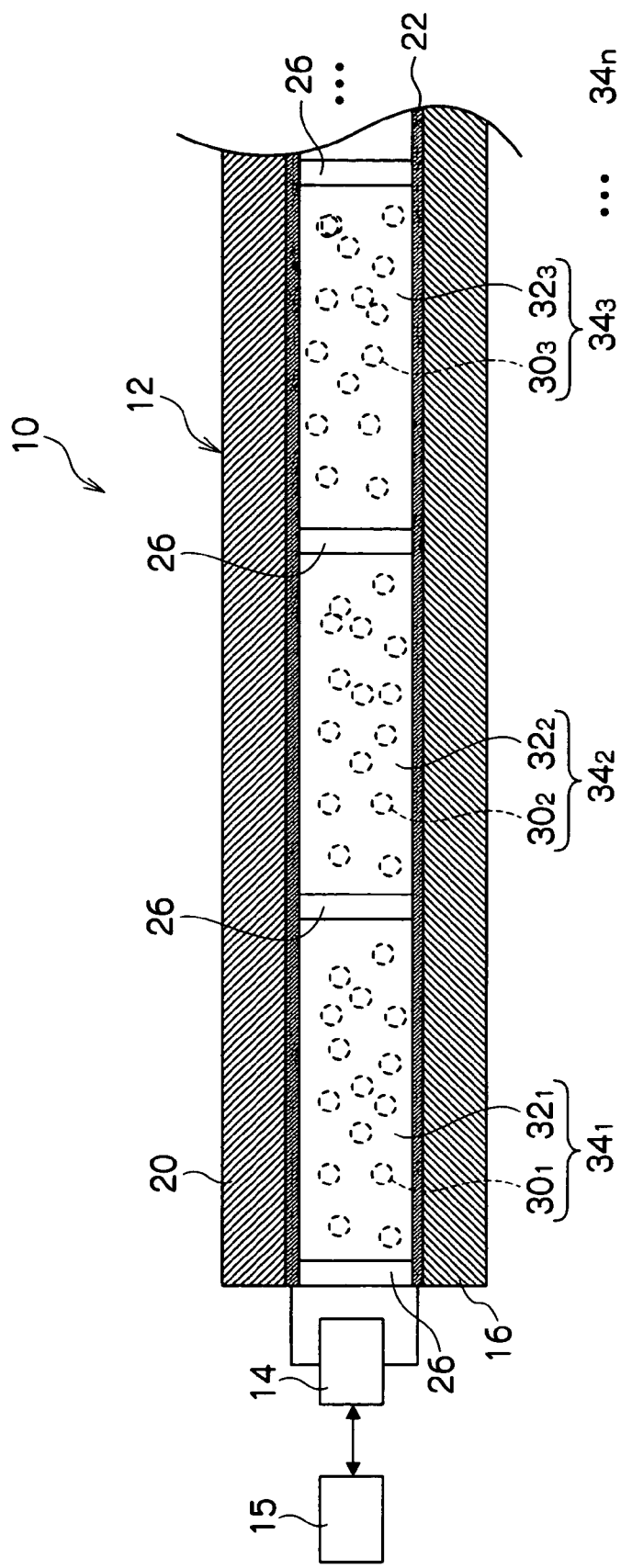
FIG. 5 is a schematic view showing a display device in which a cell is configured so that two or more kinds of polygonal metal particles having different shapes are deposited.

In addition, in a display medium 12, in the case of a construction where a plurality of cells are arranged in a direction along a plate surface of a rear substrate 16, as shown in FIG. 5, a kind of metal ions $30_1$ to $30_n$ enclosed in respective cell $34_1$ to cell $34_n$, respectively, a kind of a surfactant, and a concentration of a surfactant may be adjusted so as to deposit polygonal metal particles having different shapes in respective cell $34_1$ to cell $34_n$ of a display device 10.

By this, when a predetermined voltage is applied to a first electrode 24 and a second electrode 22 of a display device 10, a plurality of kinds of polygonal metal particles having different shapes can be deposited in a plurality of cell $34_1$ to cell $34_n$ in a display device 10, and various colors depending on a shape of a deposited particle can be expressed, therefore, multicolor display over a wide range of a visible light region can be easily realized by a simple construction.

Alternatively, for example, a plurality of cells are provided corresponding to each pixel of an image when an image is displayed on a display medium 12, and a kind of a metal ion, a kind of a surfactant, and a concentration of a surfactant may be adjusted so that polygonal metal particles having different shapes are deposited, and those particles exhibit different color showing properties.

By this, it becomes possible to adjust a displayed color every region corresponding to each pixel of a display medium 12 of a display device 10, and it becomes possible to provide a display medium 12 and a display device 10 which display a multicolor image over a wide range of a visible light region.

EXAMPLES

Hereinbelow, the present invention will be further specifically described by giving EXAMPLES. However, the present invention is not limited by these representative EXAMPLES.

Example 1

A display device 10 having a construction shown in FIG. 1 is manufactured by the following procedure.

First, as a displaying substrate, a 3×3 cm glass substrate having a thickness of 1 mm is prepared. On this glass substrate, a film of ITO (tin oxide-indium oxide) is formed on a whole glass substrate at a thickness of 200 nm by a sputtering method, to form a first electrode.

As a rear substrate, on the glass substrate, as in a first electrode, a film of ITO (tin oxide-indium oxide) is formed on a whole glass substrate at a thickness of 200 nm by a sputtering method, to form a second electrode.

Then, silver iodide (manufactured by Aldrich) and lithium iodide (manufactured by Aldrich) are dissolved in dimethyl sulfoxide (DMSO, manufactured by Aldrich), to adjust each concentration to 5 mmol/l. Further, those silver iodide solution and lithium iodide solution are mixed at an equivalent amount.

Further, as a surfactant, hexadecyltrimethylammonium bromide having an alkyl chain of a carbon number of 16 (C16) is added to a concentration of 0.5 mmol/l, and tetradodecylammonium bromide having an alkyl chain of a carbon number of 12 (C12) is added to a concentration of 0.25 mmol/l, thereby, an electrolytic solution containing at least a silver ion and a surfactant is prepared.

A leader wiring having a suitable length is connected to each of the first electrode and the second electrode, allowing for application of a voltage.

Then, a gap member consisting of a polyimide resin of a height of 200 μm is arranged on a first electrode of a glass substrate on which the first electrode has been formed, at an area of a deposition part on a first electrode of 1.5 cm², so that a gap between a first electrode and a second electrode becomes 200 μm. Thereafter, a first electrode on a surface substrate and a second electrode on a rear substrate are overlaid so as to confront each other, to form a laminate and, subsequently, a full circumference except a part, of an end face of this laminate is cured with araldite (manufactured by Huntsman-Advanced-Materials) which is an epoxy-based adhesive.

Then, the electrolytic solution is filled into a laminate through a part in which an end face of a laminate is not sealed (electrolytic solution injecting port), and the electrolytic solution injecting port is sealed with araldite. Thereby, a display medium is manufactured.

The first electrode and the second electrode are connected to a function generator (manufactured by Techtronics: a AFG310) as a voltage applying part via each leading wiring, so that they can receive a signal. Further, to this function generator is connected a personal computer as a controlling part. By such the construction, the state where a voltage of an arbitrary waveform can be applied to an electrolytic solution layer is realized. Thereby, a display device is manufactured.

Then, a reduction potential of a silver ion dissolved in an electrolytic solution layer of the above-manufactured display medium is measured.

A reduction potential is measured by the technique of cyclic voltammetry (CV).

Specifically,

Measuring equipment: electrochemical analyzer (CHI604A) manufactured by ALS

Working electrode/counter electrode: Pt electrode

Reference electrode: Pt electrode

Sample solution: electrolytic solution

Measuring mode: DC

Scan Range: 1.0 to −1.50 V

Scan Rate: 0.1 V/s

A method of analyzing measured data obtained by the measuring equipment and measuring condition will be explained.

Figure 6:
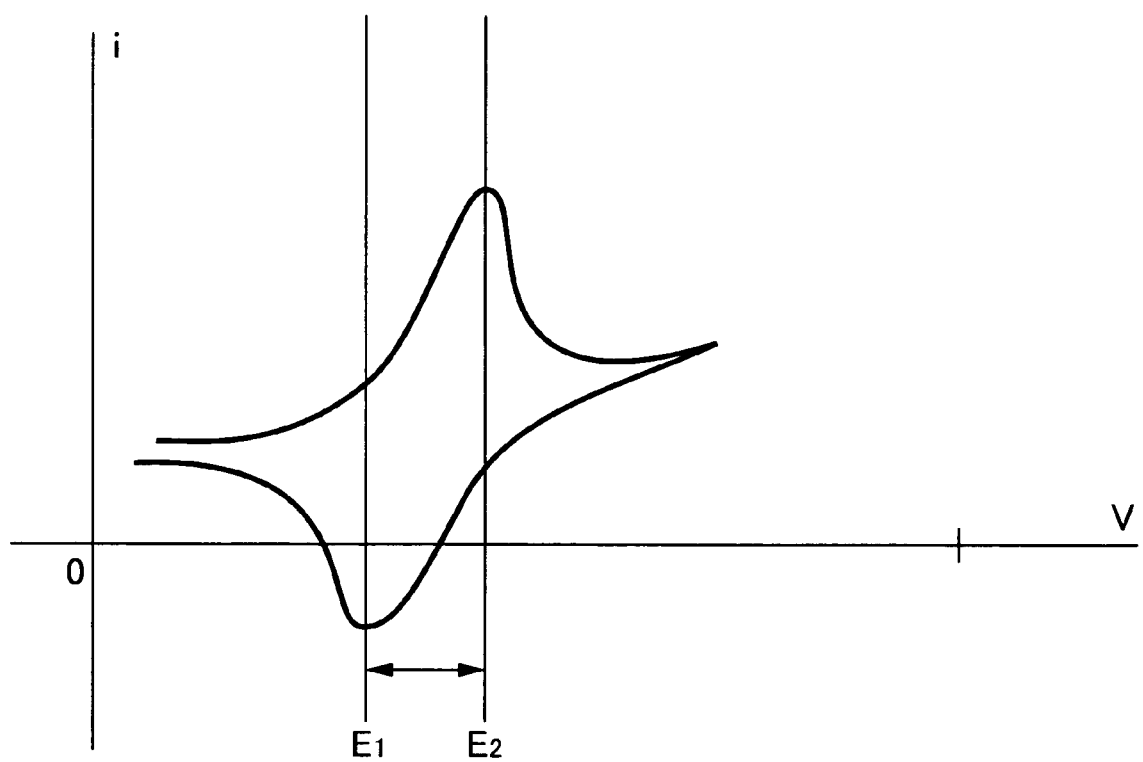
FIG. 6 is a schematic view showing one example of reduction potential measurement data.
Figure 7:
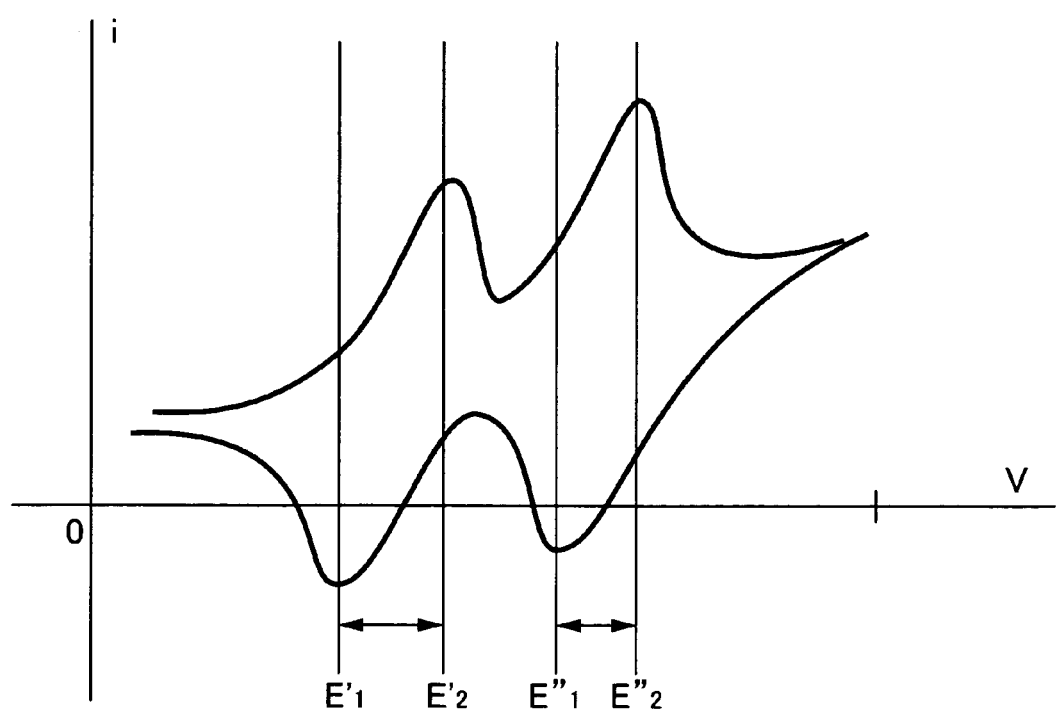
FIG. 7 is a schematic view showing a different example from that of FIG. 6, of reduction potential measurement data.

An example of data measured under the aforementioned condition is shown in FIG. 6 and FIG. 7. In a graph, an upper curve indicates a reducing reaction of an oxidant, and a lower curve indicates an oxidation reaction of a reductant.

In the case of FIG. 6, an average of a potential E1 at a peak value of a lower curve and a potential E2 at a peak value of an upper curve is the reduction potential.

Reduction potential=$(E1+E2)/2$

When a curve having a plurality of peaks as in FIG. 7 is obtained, a value which is greater (nearer 0) as a reduction wave is adopted as a representative value. That is, values of E'1 and E'2 in FIG. 7 are adopted, and an average thereof is the reduction potential.

Reduction potential=$(E'1+E'2)/2$

Figure 8:
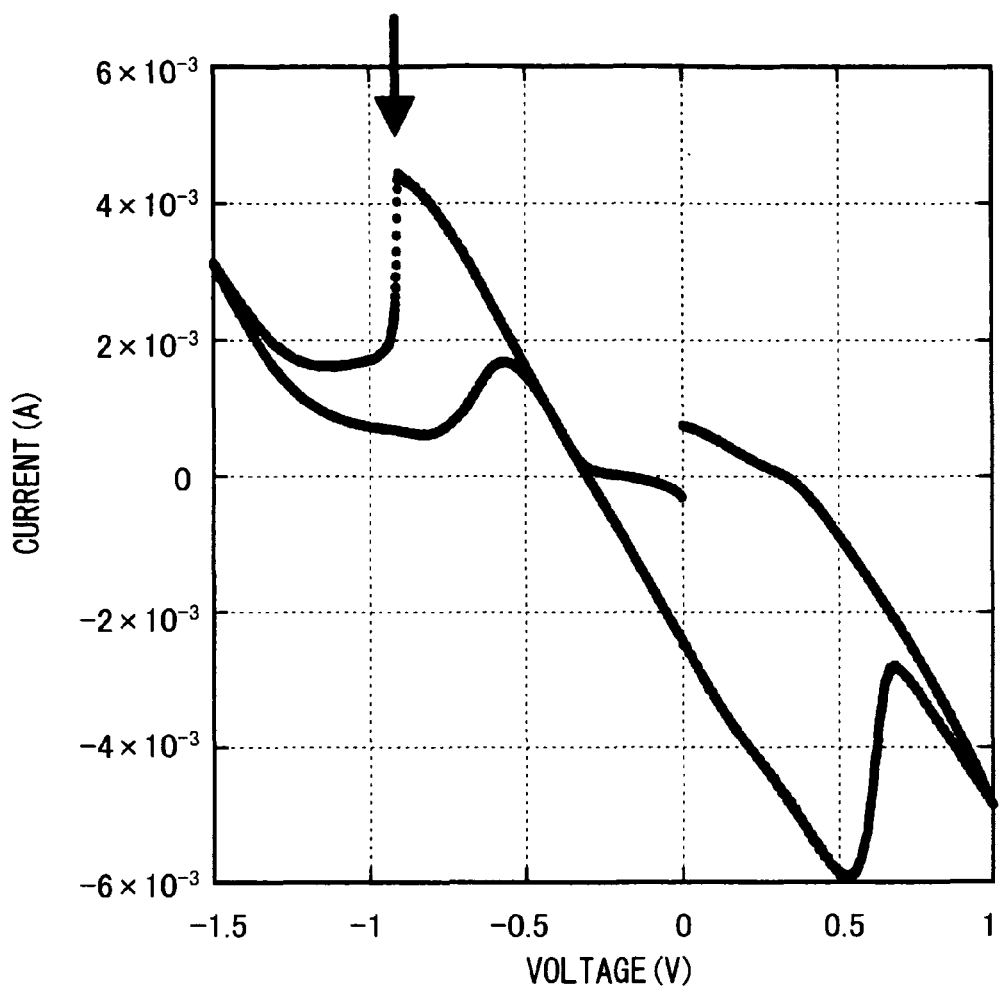
FIG. 8 is a diagram showing reduction potential measurement data in Example 1.

When a reduction potential is measured by the aforementioned measuring method using an electrolytic solution prepared in Example 1, result shown in FIG. 8 is obtained. From this result, it is seen that a reduction potential in the electrolytic solution calculated from the aforementioned analyzing method is about −200 mV. In this respect, in the present Example, in order to make deposition sure, as a reduction potential, about −900 mV which is a peak value of a reducing reaction is adopted.

Figure 9:
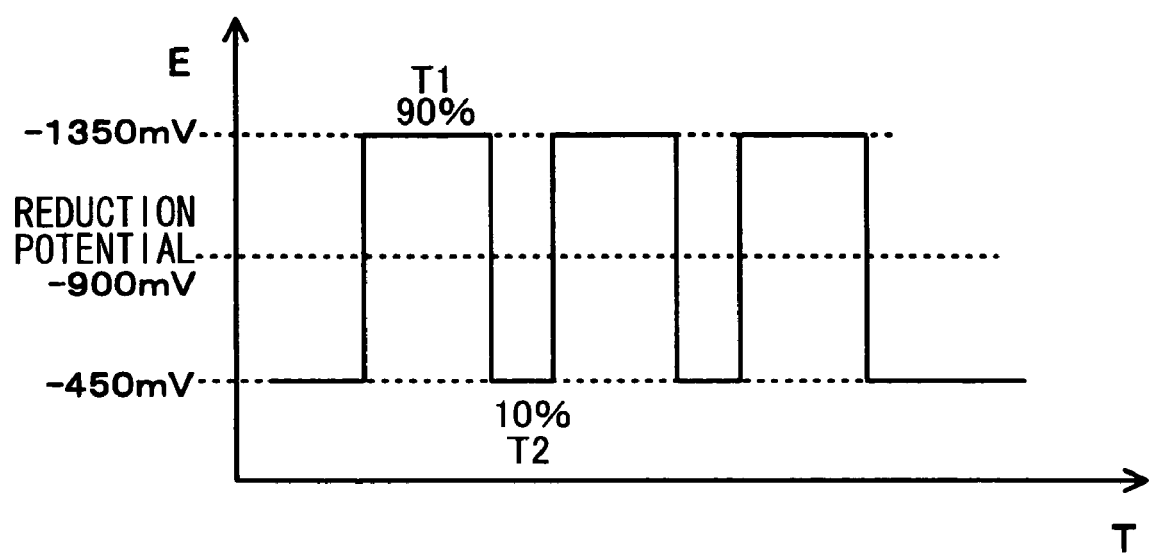
FIG. 9 is a schematic view showing a first voltage waveform used in Example 1.

Then, a minus terminal of a function generator as the voltage application part is connected to a first electrode, a plus terminal of a function generator is connected to a second electrode and, as a first voltage waveform, a voltage changing with a rectangular wave shown in FIG. 9 is applied.

In a rectangular wave shown in FIG. 9, a potential corresponding to a half-value line of the rectangular wave (intermediate of pulse amplitude) is −900 mV which is a reduction potential. In addition, since from measurement result shown in FIG. 8, increase in a current value is seen again by application of a voltage of −1400 mV or more (application of minus voltage more than absolute value of −1400 mV), 900 mV is adopted as a pulse amplitude of a rectangular wave as a first voltage waveform so that a voltage more than −1400 mV, for example, a voltage such as −1600 mV is not applied. A frequency of this rectangular wave is 100 Hz, and a value shown by $\{T1\times100/(T1+T2)\}$ of a deposition potential continuation voltage application time T1 and a dissolution potential continuation voltage application time T2 is 90%.

When this rectangular wave as a voltage waveform shown by FIG. 9 is applied to the electrolytic solution layer for 200 seconds via a first electrode and a second electrode, a first electrode part is colored with yellow. An absorption peak wavelength of a surface of this first electrode is measured using Hitachi spectrophotometer U-4100, and is found to be about 500 nm.

Figure 10:
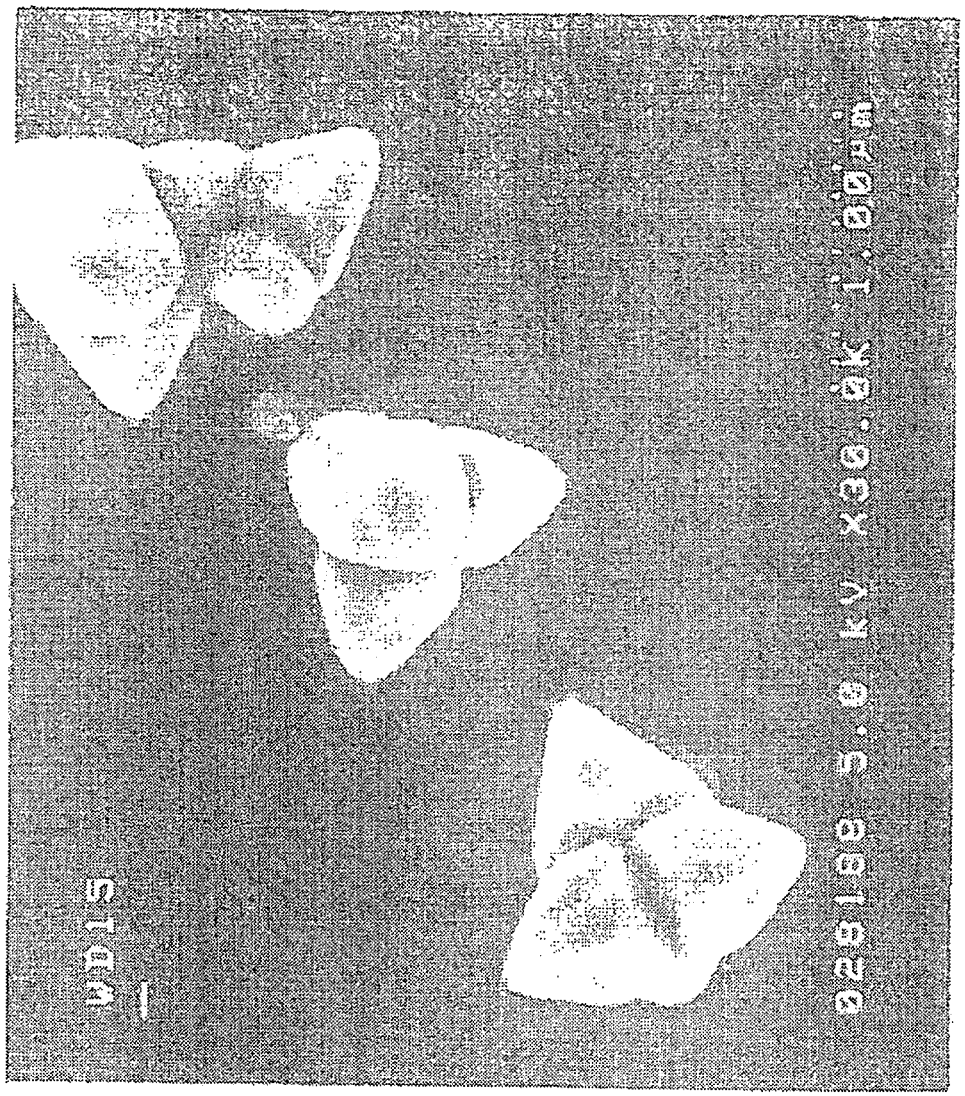
FIG. 10 is a scanning electron microscope photograph (magnification ×30,000) of a polygonal metal particle deposited in Example 1.

Further, when a surface of this first electrode is observed with a scanning electron microscope manufactured by Hitachi, Ltd. (FE-SEM: S-4500, magnification ×10,000 to 100,000), deposition of a triangular pyramid shape polygonal metal particle having one side of not more than about 100 to 300 nm is observed as shown in a photograph (magnification ×30,000) of FIG. 10. Since only one absorption peak is observed, it is thought that a difference in a length of each side is little.

Further, these polygonal metal particles are aggregated, and a triangular pyramid shape polygonal metal particle as a higher-order structure is observed.

Further, when analyzed with FE-SEM energy dispersion-type X-ray analyzing apparatus (EDX), it is confirmed that a deposited particle is silver. That is, it is confirmed that a polygonal metal particle deposited on a surface of a first electrode is such that a silver ion in an electrolyte solution is reduction-deposited.

A length of one side of the particle is obtained by actually measuring from images taking arbitrary five points of a surface of a first electrode at magnification ×60,000 using the aforementioned scanning electron microscope manufactured by Hitachi, Ltd. (FE-SEM: S-4500), and converting with a magnification.

The "length of one side" in Example 1 is obtained by actually measuring a length of one side (i.e. long side) of a triangular pyramid shape silver particle constituting an aggregate.

Example 2

According to the same manner as that of Example 1 except that, as an electrolytic solution, in place of a surfactant (hexadecyltrimethylammonium bromide and tetradecylammonium bromide) used in Example 1, tetrabutylammonium bromide having an alkyl chain of a carbon number of 4 (C4) is added to 0.5 mmol/l to prepare an electrolytic solution containing at least a silver ion and a surfactant, a display medium and a display device is manufactured and, when a rectangular wave as a voltage waveform shown by FIG. 9 is applied to the electrolytic solution layer for 200 seconds via a first electrode and a second electrode as in Example 1, a first electrode part is colored with faint black to red. An absorption peak wavelength of a surface of this first electrode is measured using Hitachi spectrophotometer U-4100, and a broad peak is observed at about 450 nm.

Figure 11:
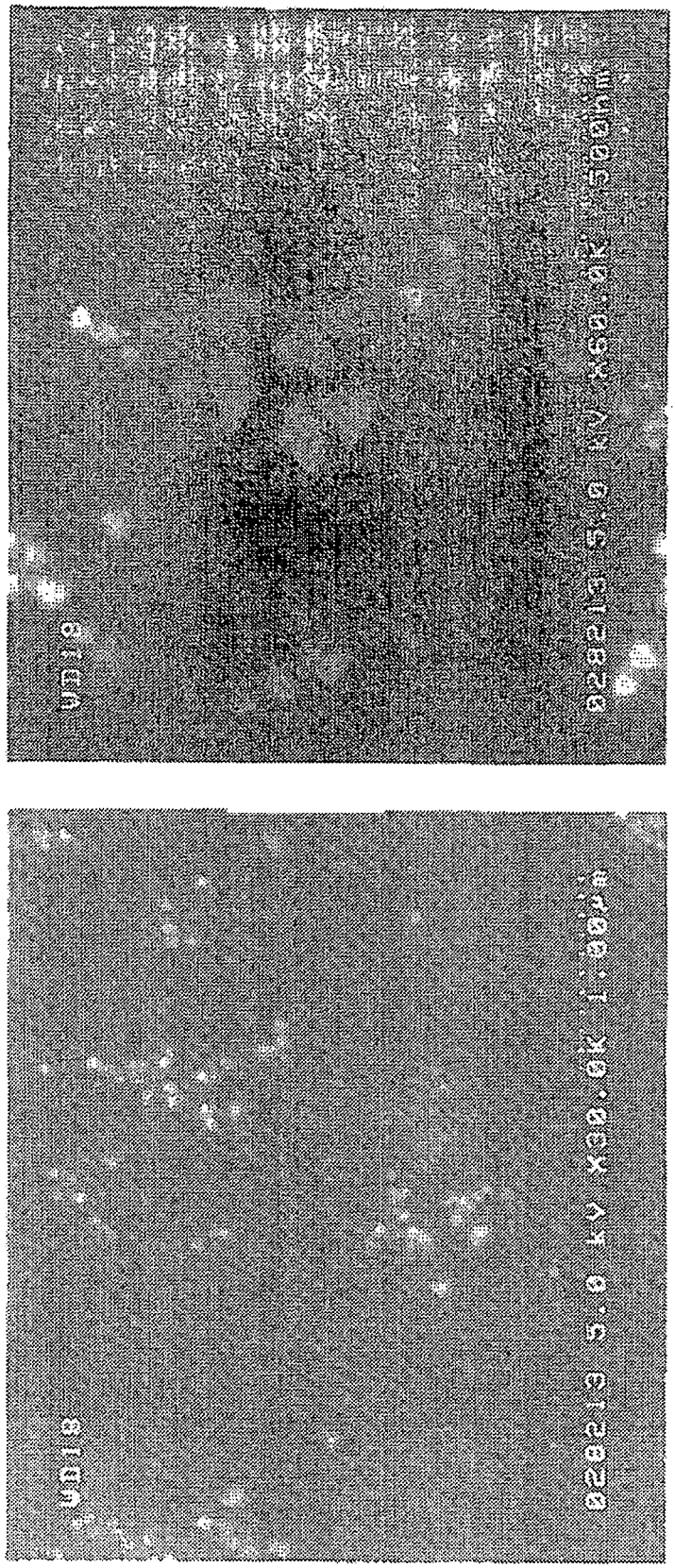
FIG. 11A and FIG. 11B are a scanning electron microscope photograph (FIG. 11A magnification ×30,000, FIG. 11B magnification ×60,000) of a polygonal metal particle deposited in Example 2.

Further, when a surface of this first electrode is observed with a scanning electron microscope manufactured by Hitachi, Ltd. (FE-SEM: S-4500, magnification ×10,000 to 100,000), deposition of a triangle pole-like polygonal metal particle having one side of about 50 nm or smaller is observed as shown by a photograph of FIG. 11 (FIG. 11A magnification ×30,000, FIG. 11B magnification ×60,000).

Further, when analyzed with FE-SEM energy dispersion-type X-ray analyzing apparatus (EDX), it is confirmed that a precipitated particle is silver. That is, it is confirmed that a polygonal metal particle deposited on a surface of a first electrode is resulted from reduction deposition of a silver ion in an electrolytic solution.

A length of one side of the particle is obtained by actually measuring from images taking arbitrary five points of a surface of a first electrode at magnification ×100,000 using the aforementioned scanning electron microscope manufactured by Hitachi, Ltd. (FE-SEM: S-4500), and converting with a magnification.

In addition, the "length of one side" in Example 2 is obtained by actually measuring a length of a longest side of a surface constituting a triangle.

Example 3

According to the same manner as that of Example 1 except that, as an electrolytic solution, in place of a surfactant (hexadecyltrimethylammonium bromide and tetradecylammonium bromide) used in Example 1, tetraoctylammonium bromide having an alkyl chain of a carbon number of 8 (C8) is added to a concentration of 0.5 mmol/l to prepare an electrolytic solution containing at least a silver ion and a surfactant, a display medium and a display device are manufactured and, when a rectangular wave as a voltage waveform shown by FIG. 9 is applied to the electrolytic solution layer for 200 seconds via a first electrode and a second electrode as in Example 1, a first electrode part is colored with faint black to red. When an absorption peak wavelength of a surface of this first electrode is measured using Hitachi spectrophotometer U-4100, a broad peak is observed at about 450 nm.

Figure 12:
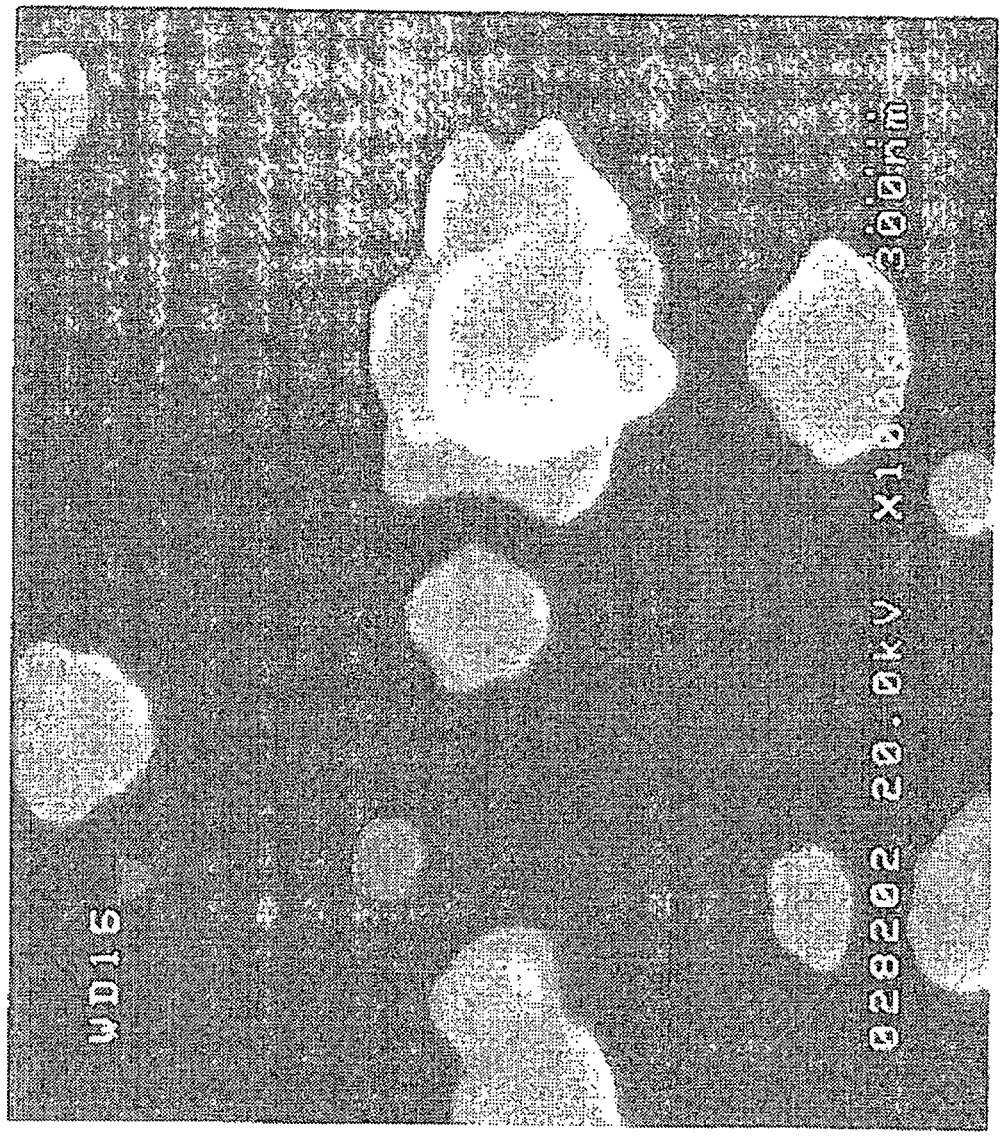
FIG. 12 is a scanning electron microscope photograph (magnification ×100,000) of a polygonal metal particle deposited in Example 3.

Further, when a surface of this first electrode is observed with a scanning electron microscope manufactured by Hitachi, Ltd. (FE-SEM: S-4500, magnification ×10,000 to 100,000), deposition of a square-shaped polygonal metal particle having one side of about 1,500 nm or smaller is observed as shown in a photograph of FIG. 12 (magnification ×100,000).

Further, when analyzed with FE-SEM energy dispersion-type X-ray analyzing apparatus (EDX), it is confirmed that a deposited particle is silver. That is, it is confirmed that a polygonal metal particle deposited on a surface of a first electrode is resulted from reduction deposition of a silver ion in an electrolytic solution.

A length of one side of the particle is obtained by actually measuring from images taking arbitrary five points of a surface of a first electrode at a magnification ×100,000 using the aforementioned scanning electron microscope manufactured by Hitachi, Ltd. (FE-SEM: SE-4500), and converting with a magnification.

In addition, the "length of one side" in Example 3 is obtained by actually measuring a length of a longest side of each particle.

Example 4

According to the same manner as that of Example 1 except that, as an electrolytic solution, in place of a surfactant (hexadecyltrimethylammonium bromide and tetradecylammonium bromide) used in Example 1, hexadecyltrimethylammonium bromide having an alkyl chain of a carbon number of 16 (C16) is added to a concentration of 0.5 mmol/l and, at the same time, tetradodecylammonium bromide of a carbon number of 12 (C12) is added to a concentration of 0.5 mmol/l to prepare an electrolytic solution containing at least a silver ion and a surfactant, a display medium and a display device are manufactured and, when a rectangular wave as a voltage waveform shown by FIG. 9 is applied to the electrolytic solution layer for 200 seconds via a first electrode and a second electrode as in Example 1, a first electrode part is colored with faint black to red. When an absorption peak wavelength of a surface of this first electrode is measured using Hitachi spectrophotometer U-4100, a broad peak is observed at about 450 nm.

Figure 13:
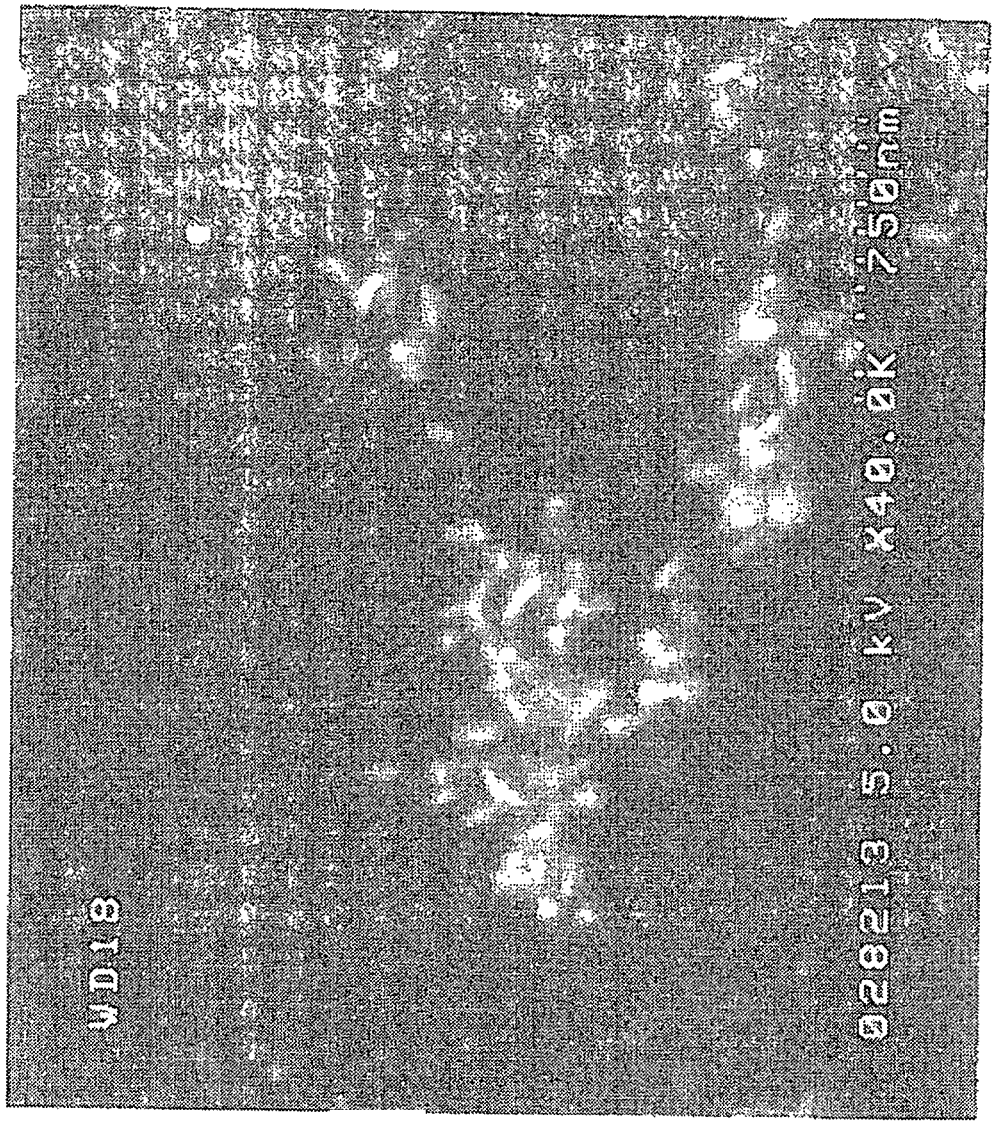
FIG. 13 is a scanning electron microscope photograph (magnification ×40,000) of a polygonal metal particle deposited in Example 4.

Further, when a surface of this first electrode is observed with a scanning electron microscope manufactured by Hitachi, Ltd. (FE-SEM: S-4500, magnification ×10,000 to 100,000), deposition of a cyrindrical polygonal metal particle having one side of about 500 nm or smaller is observed as shown in a photograph of FIG. 13 (magnification ×40,000).

Further, when analyzed with FE-SEM energy dispersion-type X-ray analyzing apparatus (EDX), it is confirmed that a deposited particle is silver. That is, it is confirmed that a polygonal metal particle deposited on a surface of a first electrode is resulted from reduction deposition of a silver ion in an electrolytic solution.

A length of one side of the particle is obtained by actually measuring a length in a continuous direction of a pillar particle from images taking arbitrary five points of a surface of a first electrode at a magnification ×100000 using the aforementioned scanning electron microscope manufactured by Hitachi, Ltd. (FE-SEM: SE-4500), and converting with a magnification.

In addition, the "length of one side" in Example 4 is obtained by actually measuring a longest length in a continuous direction of a cylindrical article.

Example 5

According to the same manner as that of Example 1 except that, as an electrolytic solution, in place of a surfactant (hexadecyltriemthylammonium bromide and tetradodecylammonium bromide), sodium dodecyl sulfate (SDS) having a sulfate ester group as a hydrophilic group and having an alkyl chain of a carbon number of 12 (C12) is added to a concentration of 0.5 mmol/l to prepare an electrolytic solution containing at least a silver ion and a surfactant, an apparatus for producing a silver triangular pyramid particle is manufactured and, when a rectangular wave as a voltage waveform shown by FIG. 9 is applied to the electrolytic solution layer for 200 seconds via a first electrode and a second electrode as in Example 1, a first electrode part is colored with pale yellow. When an absorption peak wavelength of a surface of this first electrode is measured using Hitachi spectrophotometer U-4100, a broad peak is observed at about 500 nm.

Figure 15B:
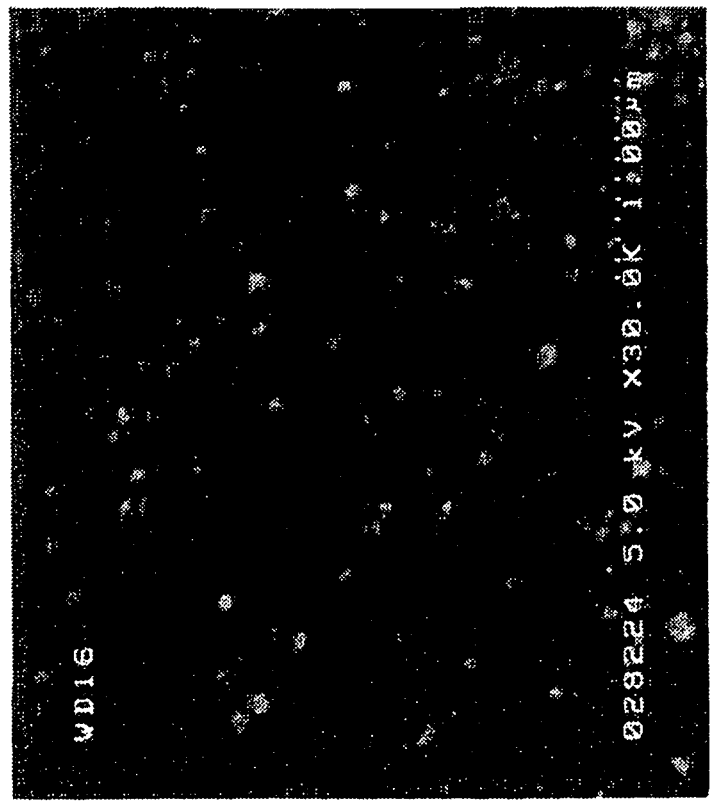
FIG. 15A and FIG. 15B are scanning electron microscope photographs (FIG. 15A magnification ×30,000, FIG. 15B magnification ×100,000) of a polygonal metal particle deposited in Example 5.
Figure 15A:
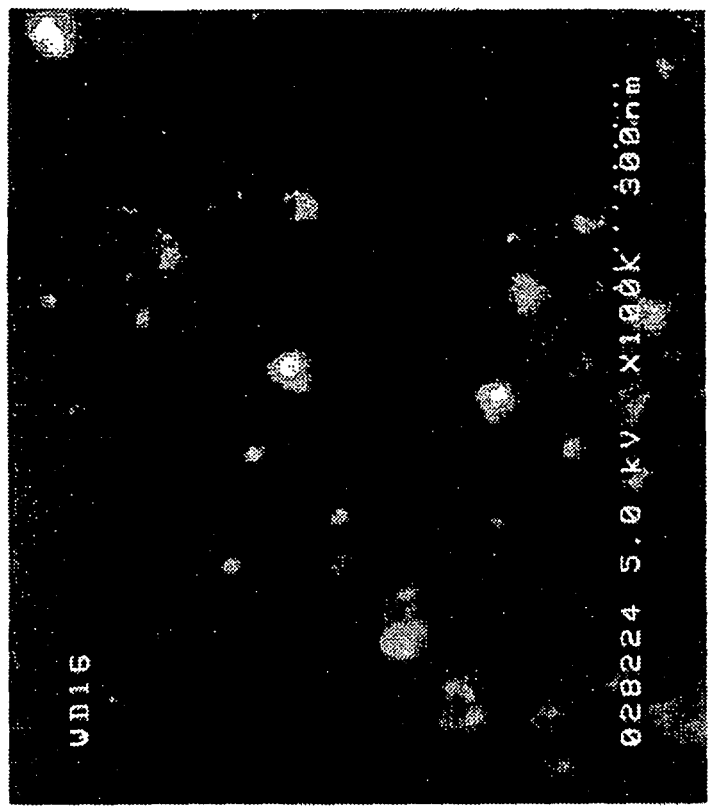

Further, when a surface of this first electrode is observed with a scanning electron microscope manufactured by Hitachi, Ltd. (FE-SEM: S-4500, magnification ×10,000 to 100,000), deposition of a polygonal particle having one side of about 100 nm or less is observed as shown in a FIG. 15 (FIG. 15A magnification ×30,000, FIG. 15B magnification ×100,000).

Further, when analyzed with FE-SEM energy dispersion-type X-ray analyzing apparatus (EDX), it is confirmed that a deposited particle is silver. That is, it is confirmed that a silver triangular pyramid particle deposited on a surface of a first electrode is resulted from reduction deposition of a silver ion in an electrolytic solution.

A length of one side of the particle is obtained by actually measuring from images taking arbitrary five points of a surface of a first electrode at a magnification ×60,000 using the aforementioned scanning electron microscope manufactured by Hitachi, Ltd. (FE-SEM: SE-4500), and converting with a magnification.

Example 6

According to the same manner as that of Example 1 except that, as an electrolytic solution, in place of a surfactant (hexadecyltrimethylammonium bromide and tetradecylammonium bromide) used in Example 1, tetrabutylammonium bromide having an alkyl chain of a carbon number of 4 (C4) is added to a concentration of 0.05 mmol/l to prepare an electrolytic solution containing at least a silver ion and a surfactant, a display medium and a display device are manufactured and, when a rectangular wave as a voltage waveform shown by FIG. 9 is applied to the electrolytic solution layer for 200 seconds via a first electrode and a second electrode as in Example 1, a first electrode part is colored with pale red. When an absorption peak wavelength of a surface of this first electrode is measured using Hitachi spectrophotometer U-4100, a broad peak is observed at about 400 nm.

Figure 16:
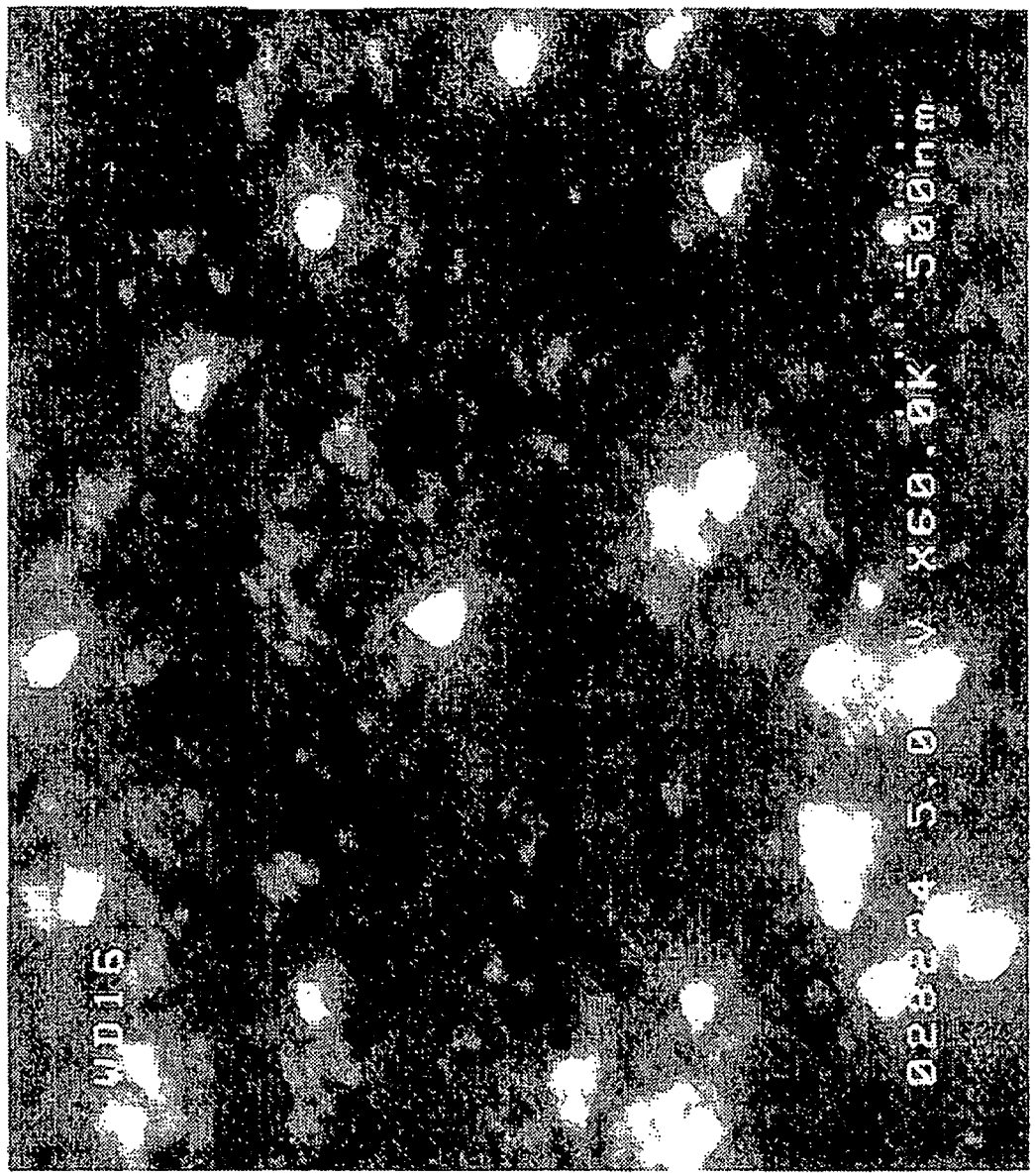
FIG. 16 is a scanning electron microscope photograph (magnification ×60,000) of a polygonal metal particle deposited in Example 6.

Further, when a surface of this first electrode is observed with a scanning electron microscope manufactured by Hitachi, Ltd. (FE-SEM: S-4500, magnification ×10,000 to 100,000), deposition of a triangle pole shape polygonal metal particle having one side of about 100 nm or smaller is observed as shown in a photograph of FIG. 16 (magnification ×60,000).

Further, when analyzed with FE-SEM energy dispersion-type X-ray analyzing apparatus (EDX), it is confirmed that a deposited particle is silver. That is, it is confirmed that a polygonal metal particle deposited on a surface of a first electrode is resulted from reduction deposition of a silver ion in an electrolytic solution.

A length of one side of the particle is obtained by actually measuring from images taking arbitrary five points of a surface of a first electrode at a magnification ×100,000 using the aforementioned scanning electron microscope manufactured by Hitachi, Ltd. (FE-SEM: SE-4500), and converting with a magnification.

In addition, the "length of one side" in Example 6 is obtained by actually measuring a length of a longest side of a surface constituting a triangle.

Example 7

According to the same manner as that of Example 1 except that, as an electrolytic solution, in place of a surfactant (hexadecyltrimethylammonium bromide and tetradecylammonium bromide) used in Example 1, tetrabutylammonium bromide having an alkyl chain of a carbon number of 4 (C4) is added to a concentration of 150 mmol/l to prepare an electrolytic solution containing at least a silver ion and a surfactant, a display medium and a display device are manufactured and, when a rectangular wave as a voltage waveform shown by FIG. 9 is applied to the electrolytic solution layer for 200 seconds via a first electrode and a second electrode as in Example 1, a first electrode part is colored with faint gray. When an absorption peak wavelength of a surface of this first electrode is measured using Hitachi spectrophotometer U-4100, a clear peak is observed.

Figure 17B:
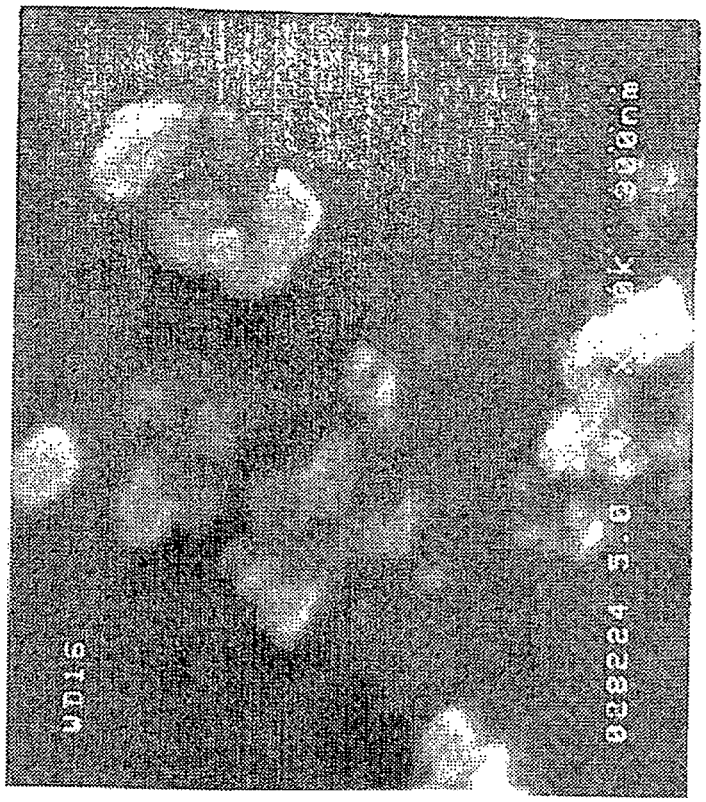
FIGS. 17A and 17B are scanning electron microscope photographs (FIG. 17A magnification ×30,000, FIG. 17B magnification ×100,000) of a polygonal metal particle deposited in Example 7.
Figure 17A:
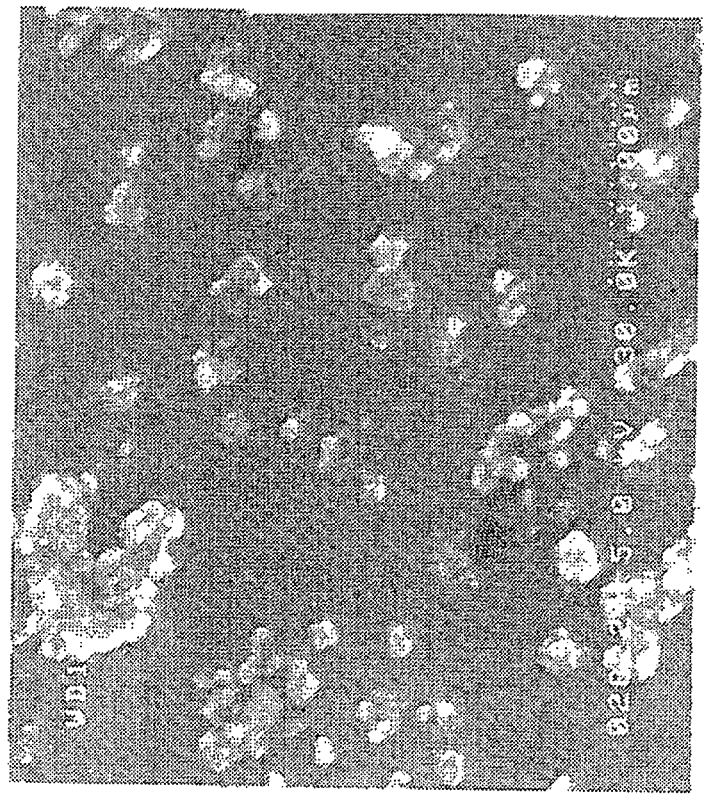

Further, when a surface of this first electrode is observed with a scanning electron microscope manufactured by Hitachi, Ltd. (FE-SEM: S-4500, magnification ×10,000 to 100,000), deposition of an indeterminate polygonal metal particle having one side of about 100 nm or smaller is observed as shown in a photograph of FIG. 17 (FIG. 17A magnification ×30,000, FIG. 17B magnification ×100,000).

Further, when analyzed with FE-SEM energy dispersion-type X-ray analyzing apparatus (EDX), it is confirmed that a deposited particle is silver. That is, it is confirmed that a polygonal metal particle deposited on a surface of a first electrode is resulted from reduction deposition of a silver ion in an electrolytic solution.

A length of one side of the particle is obtained by actually measuring from images taking arbitrary five points of a surface of a first electrode at a magnification ×100,000 using the aforementioned scanning electron microscope manufactured by Hitachi, Ltd. (FE-SEM: SE-4500), and converting with a magnification.

In addition, the "length of one side" in Example 7 is obtained by actually measuring a length of a longest side of each particle.

Example 8

According to the same manner as that of Example 1 except that, as an electrolytic solution, in place of a surfactant (hexadecyltrimethylammonium bromide and tetradecylammonium bromide) used in Example 1, tetraobutylammonium bromide having an alkyl chain of a carbon number of 4 (C4) is added to a concentration of 50 mmol/l to prepare an electrolytic solution containing at least a silver ion and a surfactant, a display medium and a display device are manufactured and, when a rectangular wave as a voltage waveform shown by FIG. 9 is applied to the electrolytic solution layer for 200 seconds via a first electrode and a second electrode as in Example 1, a first electrode part is colored with pale yellow. When an absorption peak wavelength of a surface of this first electrode is measured using Hitachi spectrophotometer U-4100, a peak is observed at about 500 nm.

Figure 18B:
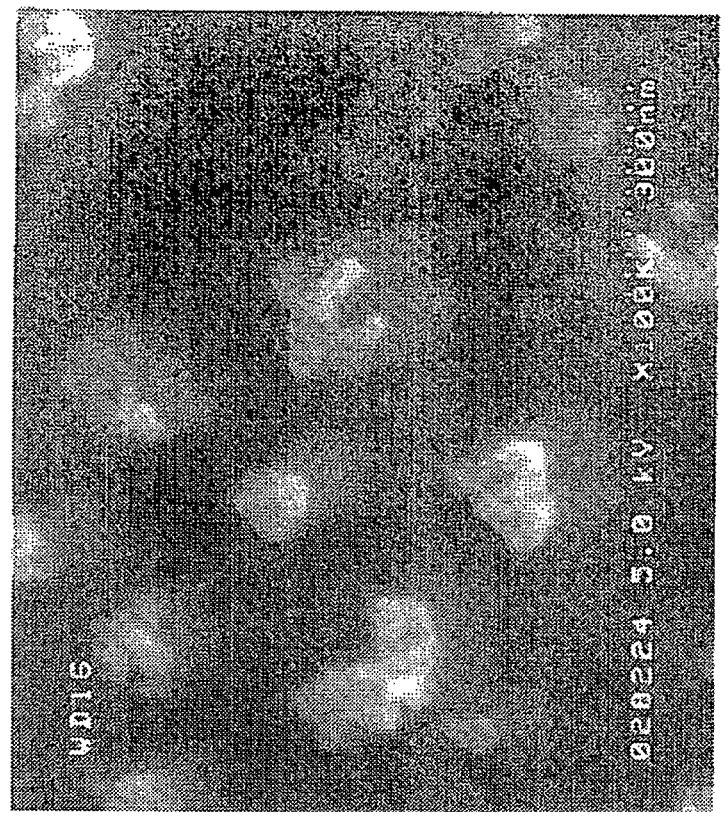
FIG. 18A and FIG. 18B are scanning electron microscope photographs (FIG. 18A magnification ×60,000, FIG. 18B magnification ×100,000) of a polygonal metal particle deposited in Example 8.
Figure 18A:
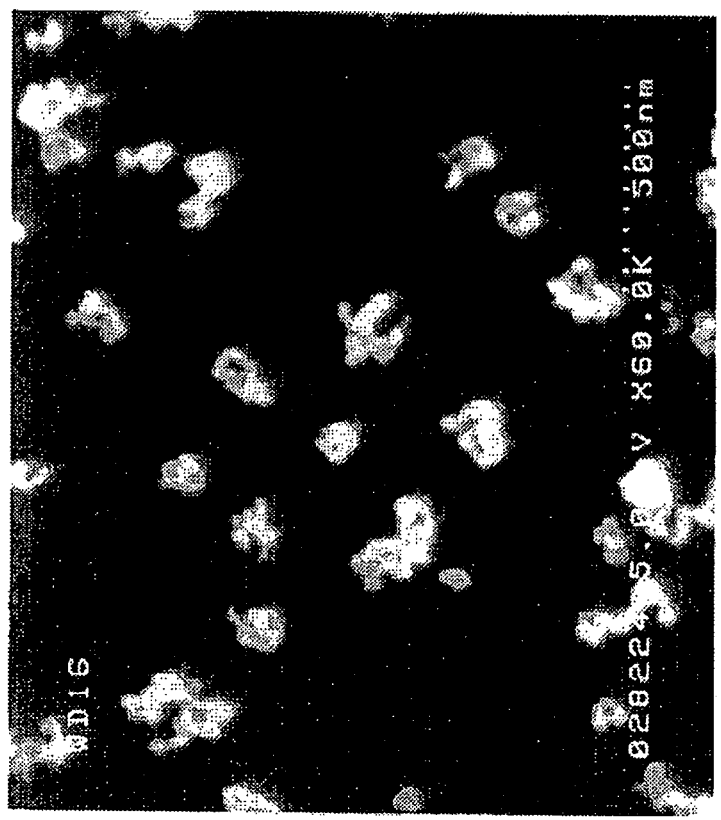

Further, when a surface of this first electrode is observed with a scanning electron microscope manufactured by Hitachi, Ltd. (FE-SEM: S-4500, magnification ×10,000 to 100,000), deposition of an indeterminate polygonal metal particle having one side of about 50 nm or smaller is observed as shown in a photograph of FIG. 18 (FIG. 18A magnification ×60,000, FIG. 18B magnification ×100,000). Further, it is seen that those are aggregated to constitute a high-order structure.

Further, when analyzed with FE-SEM energy dispersion-type X-ray analyzing apparatus (EDX), it is confirmed that a deposited particle is silver. That is, it is confirmed that a polygonal metal particle deposited on a surface of a first electrode is resulted from reduction deposition of a silver ion in an electrolytic solution.

A length of one side of the particle is obtained by actually measuring from images taking arbitrary five points of a surface of a first electrode at a magnifications ×100000 using the aforementioned scanning electron microscope manufactured by Hitachi, Ltd. (FE-SEM: SE-4500), and converting with a magnification.

In addition, the "length of one side" in Example 8 is obtained by actually measuring a length of a longest side of each particle.

Comparative Example 1

According to the same manner as that of Example 1 except that, as an electrolytic solution, an electrolytic solution not containing a surfactant (specifically, the hexadecyltrimethylammonium bromide and tetradecylammonium bromide added to an electrolytic solution in Example 1) is prepared, a display medium and a display device are manufactured and, when a rectangular wave as a voltage waveform shown by FIG. 9 is applied to the electrolytic solution layer for 200 seconds via a first electrode and a second electrode as in Example 1, a first electrode part is colored with faint gray. When an absorption peak wavelength of a surface of this first electrode is measured using Hitachi spectrophotometer U-4100, and is found to be about 410 nm.

Figure 14:
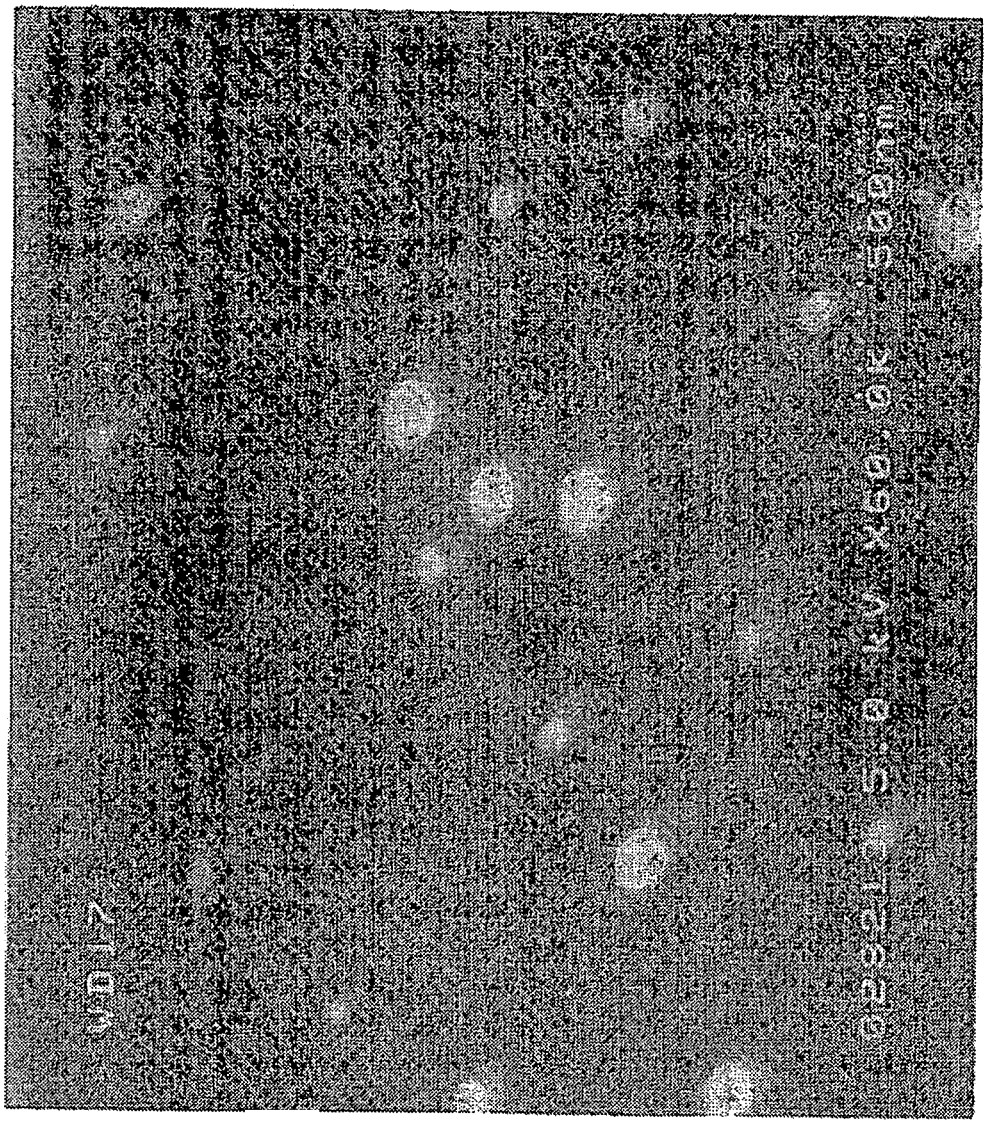
FIG. 14 is a scanning electron microscope photograph (magnification ×60,000) of a polygonal metal particle deposited in Comparative Example 1.

Further, when a surface of this first electrode is observed with a scanning electron microscope manufactured by Hitachi, Ltd. (FE-SEM: S-4500, magnification ×10,000 to 100, 000), deposition of a spherical particle having a particle diameter of about 20 nm to 50 nm is observed as shown in a photograph of FIG. 14 (magnification ×60,000).

Further, when analyzed with FE-SEM energy dispersion-type X-ray analyzing apparatus (EDX), it is confirmed that a deposited particle is silver. That is, it is confirmed that a particle deposited on a surface of a first electrode is resulted from reduction deposition of a silver ion in an electrolytic solution.

The particle diameter is obtained by actually measuring from images taking arbitrary five points of a surface of a first electrode at a magnification ×60,000 using the aforementioned scanning electron microscope manufactured by Hitachi, Ltd. (FE-SEM: SE-4500), and converting with a magnification.

Comparative Example 2

According to the same manner as that of Example 1 except that, as an electrolytic solution, an electrolytic solution not containing a surfactant (specifically, the hexadecyltriemthylammonium bromide and tetradodecylammonium bromide added to an electrolytic solution in Example 1) is prepared, a display medium and a display device are manufactured and, when a rectangular wave of a voltage waveform shown by FIG. 9 in which T1×100/(T1+T2) is 60% unlike Comparative Example 1 is applied to the electrolytic solution layer for 200 seconds via a first electrode and a second electrode, a first electrode part is colored with faint gray. When an absorption peak wavelength of a surface of this first electrode is measured using Hitachi spectrophotometer U-4100, about 410 nm is found.

Further, when a surface of this first electrode is observed with a scanning electron microscope manufactured by Hitachi, Ltd. (FE-SEM: S-4500, magnification ×10,000 to 100,000), deposition of a spherical particle having a particle diameter of about 20 nm or less is observed as in Comparative Example 1.

Further, when analyzed with FE-SEM energy dispersion-type X-ray analyzing apparatus (EDX), it is confirmed that a deposited particle is silver. That is, it is confirmed that a particle deposited on a surface of a first electrode is resulted from reduction deposition of a silver ion in an electrolytic solution.

The particle diameter is obtained by actually measuring from images taking arbitrary five points of a surface of a first electrode at a magnification ×60,000 using the aforementioned scanning electron microscope manufactured by Hitachi, Ltd. (FE-SEM: SE-4500), and converting with a magnification.

Comparative Example 3

According to the same manner as that of Example 1 except that, as an electrolytic solution, an electrolytic solution not containing a surfactant (specifically, the hexadecyltriemthylammonium bromide and tetradodecylammonium bromide added to an electrolytic solution in Example 1) is prepared, a display medium and a display device are manufactured and, when a rectangular wave of a voltage waveform shown by FIG. 9 in which T1×100/(T1+T2) is 99% unlike Comparative Example 1 is applied to the electrolytic solution layer for 100 seconds via a first electrode and a second electrode, a first electrode part is colored with faint gray. When an absorption peak wavelength of a surface of this first electrode is measured using Hitachi spectrophotometer U-4100, a very broad peak is observed at about 410 nm.

Further, when a surface of this first electrode is observed with a scanning electron microscope manufactured by Hitachi, Ltd. (FE-SEM: S-4500, magnification ×10,000 to 100,000), appearance that spherical particles having a particle diameter of not less than about 100 nm are deposited on a whole surface is observed.

Further, when analyzed with FE-SEM energy dispersion-type X-ray analyzing apparatus (EDX), it is confirmed that a deposited particle is silver. That is, it is confirmed that a particle deposited on a surface of a first electrode is resulted from reduction deposition of a silver ion in an electrolytic solution.

The particle diameter is obtained by actually measuring from images taking arbitrary five points of a surface of a first electrode at a magnification ×60,000 using the aforementioned scanning electron microscope manufactured by Hitachi, Ltd. (FE-SEM: SE-4500), and converting with a magnification.

All publications, patent applications, and technical standards mentioned in this specification are herein incorporated by reference to the same extent as if each individual publication, patent application, or technical standard was specifically and individually indicated to be incorporated by reference.

What is claimed is:

1. A display method, comprising:
   forming an electric field in an electrolytic solution layer comprising an electrolytic solution containing at least a metal ion and a surfactant;
   thereby reducing the metal ion in the electrolytic solution layer to deposit it as a polygonal metal particle; and
   displaying a predetermined image,
   the surfactant being contained at 1 part by weight to 10,000 parts by weight based on 100 parts by weight of a metal ion in the electrolytic solution.

2. The display method of claim 1, wherein the surfactant has an alkyl chain of a carbon number of 1 to 20.

3. The display method of claim 1, wherein the polygonal metal particle which is deposited has an absorption wavelength due to surface plasmon resonance in a visible light region.

4. The display method of claim 1, wherein the polygonal metal particle has a triangular pyramid shape.

5. The display method of claim 1, wherein the polygonal metal particle has a triangle pole shape.

6. The display method of claim 1, wherein the polygonal metal particle has a cylindrical shape.

7. The display method of claim 1, wherein the polygonal metal particle has a square pole shape.

8. The display method of claim 1, wherein the metal ion is a silver ion.

9. A display medium, comprising:
   one pair of substrates which are oppositely arranged with a gap therebetween, at least one of which is transparent; and
   an electrolytic solution layer comprising an electrolytic solution containing at least a metal ion and a surfactant, which is provided between the one pair of substrates, and
   the metal ion in the electrolytic solution layer being deposited as a polygonal metal particle by applying a voltage,
   the surfactant being contained at 1 part by weight to 10,000 parts by weight based on 100 parts by weight of a metal ion in the electrolytic solution.

10. The display medium of claim 9, wherein the polygonal metal particle has an absorption wavelength due to surface plasmon resonance in a visible light region.

11. The display medium of claim 9, wherein the surfactant has an alkyl chain of a carbon number of 1 to 20.

12. The display medium of claim 9, wherein the metal ion is a silver ion.

13. A display device, comprising:
one pair of substrates which are oppositely arranged with a gap therebetween, at least one of which is transparent;
an electrolytic solution layer comprising an electrolytic solution containing at least a metal ion and a surfactant, which is provided between the one pair of substrates; and
a voltage application unit that applies to the electrolytic solution layer a voltage for reducing the metal ion contained in the electrolytic solution to be deposited as a polygonal metal particle,
the surfactant being contained at 1 part by weight to 10,000 parts by weight based on 100 parts by weight of a metal ion in the electrolytic solution.

14. The display device of claim 13, wherein the surfactant has an alkyl chain of a carbon number of 1 to 20.

15. The display device of claim 13, wherein the polygonal metal particle has an absorption wavelength due to surface plasmon resonance.

16. The display device of claim 13, wherein the polygonal metal particle has a triangular pyramid shape.

17. The display device of claim 13, wherein the polygonal metal particle has a triangle pole shape.

18. The display device of claim 13, wherein the polygonal metal particle has a cylindrical shape.

19. The display device of claim 13, wherein the polygonal metal particle has a square pole shape.

20. The display device of claim 13, which is provided with a gap member for compartmentalizing a space between the one pair of substrates into a plurality of cells along a substrate surface direction of the one pair of substrates,
and wherein shapes of the polygonal metal particles to be deposited into at least two of the plurality of cells are different.

21. The display device of claim 13, wherein the voltage applying unit applies, as a voltage to be applied to the electrolytic solution layer, a voltage which is periodically changed between a deposition potential at which the metal ion in the electrolytic solution layer is reduced to be deposited as the polygonal metal particle, and a dissolution potential at which the polygonal metal particle is oxidized to be dissolved as the metal ion, and is changed in such a voltage waveform that a time T1 during which the deposition potential is continued is greater than a time T2 during which the dissolution potential is continued.

22. The display device of claim 13, wherein the metal ion is a silver ion.

23. The display method of claim 1, wherein the forming an electric field comprises:
applying a predetermined waveform voltage for predetermined intervals to the electrolytic solution layer, the predetermined waveform voltage satisfying the following relationship:

$$100(\%) > \frac{T1}{T1+T2} \times 100 > 50(\%) \quad \text{Equation (1)}$$

where T1 is a time during which a deposition potential is continued and T2 is a time during which a dissolution potential is continued.

24. The display medium of claim 9, wherein:
a predetermined waveform voltage is applied for predetermined intervals to the electrolytic solution layer, the predetermined waveform voltage satisfying the following relationship:

$$100(\%) > \frac{T1}{T1+T2} \times 100 > 50(\%) \quad \text{Equation (1)}$$

where T1 is a time during which a deposition potential is continued and T2 is a time during which a dissolution potential is continued.

25. The display device of claim 13, wherein the voltage has a predetermined waveform, and the voltage is applied for predetermined intervals to the electrolytic solution layer, the predetermined waveform voltage satisfying the following relationship:

$$100(\%) > \frac{T1}{T1+T2} \times 100 > 50(\%) \quad \text{Equation (1)}$$

where T1 is a time during which a deposition potential is continued and T2 is a time during which a dissolution potential is continued.

26. A display method, comprising:
forming an electric field in an electrolytic solution layer comprising an electrolytic solution containing at least two metal ions;
thereby reducing the metal ions in the electrolytic solution layer to deposit as a polygonal metal particle; and,
segregating the metal ions in the electrolytic solution layer into separate cells depending upon a type of the metal ions; and
displaying a predetermined image.

27. A display medium, comprising:
one pair of substrates which are oppositely arranged with a gap therebetween, at least one of which is transparent; and
an electrolytic solution layer comprising an electrolytic solution containing at least two metal ions, which are provided between the one pair of substrates, and
the metal ions in the electrolytic solution layer being deposited as a polygonal metal particle by applying a voltage,
the metal ions in the electrolytic solution dyers-layer being segregated into separate cells depending upon a type of each of the metal ions; and
displaying a predetermined image.

28. A display device, comprising:
one pair of substrates which are oppositely arranged with a gap therebetween, at least one of which is transparent;
an electrolytic solution layer comprising an electrolytic solution containing at least two metal ions, which are provided between the one pair of substrates; and
a voltage application unit that applies to the electrolytic solution layer a voltage for reducing the metal ions contained in the electrolytic solution to be deposited as a polygonal metal particle,
the metal ions in the electrolytic solution layer being segregated into separate cells depending upon a type of each of the metal ions; and
displaying a predetermined image.

* * * * *